(12) United States Patent
Costa et al.

(10) Patent No.: US 11,653,712 B2
(45) Date of Patent: May 23, 2023

(54) AUTOMATIC INFLATION PUMP BLADDER SYSTEM

(71) Applicant: Reebok International Limited, Altrincham (GB)

(72) Inventors: Matthew Costa, Mattapoisett, MA (US); Matthew Boudreau, Mansfield, MA (US); Daniel Yang, New Taipei (TW); Che-Hao (Michael) Chow, New Taipei (TW); Paul Davis, Blackstone, MA (US)

(73) Assignee: REEBOK INTERNATIONAL LIMITED, Altrincham (GB)

( * ) Notice: Subject to any disclaimer, the term of this patent is extended or adjusted under 35 U.S.C. 154(b) by 0 days.

(21) Appl. No.: 16/786,076

(22) Filed: Feb. 10, 2020

(65) Prior Publication Data
US 2021/0244128 A1 Aug. 12, 2021

(51) Int. Cl.
| A43B 7/28 | (2006.01) |
| A43B 5/06 | (2022.01) |
| A43B 23/02 | (2006.01) |
| A43B 13/20 | (2006.01) |
| A43B 3/34 | (2022.01) |

(52) U.S. Cl.
CPC .......... *A43B 7/28* (2013.01); *A43B 3/34* (2022.01); *A43B 5/06* (2013.01); *A43B 13/203* (2013.01); *A43B 23/029* (2013.01)

(58) Field of Classification Search
CPC ... A43B 23/029; A43B 13/203; A43B 13/206; A43B 13/20; A43B 5/06; A43B 3/36; A43C 11/00

USPC .................................................. 36/29, 93
See application file for complete search history.

(56) References Cited

U.S. PATENT DOCUMENTS

| 5,113,599 | A | | 5/1992 | Cohen et al. |
| 5,230,249 | A | * | 7/1993 | Sasaki .............. A43B 13/203 36/132 |
| 5,590,696 | A | | 1/1997 | Phillips et al. |
| 5,794,366 | A | * | 8/1998 | Chien ................. A43B 3/36 40/540 |
| 5,893,219 | A | | 4/1999 | Smith et al. |
| 5,987,779 | A | * | 11/1999 | Litchfield ......... A43B 13/203 36/29 |
| 7,047,670 | B2 | | 5/2006 | Marvin et al. |

(Continued)

FOREIGN PATENT DOCUMENTS

| CN | 106307809 B | * | 4/2019 |
| CN | 111109753 A | * | 5/2020 |
| WO | 2018/192339 A1 | † | 10/2018 |

*Primary Examiner* — Jameson D Collier
*Assistant Examiner* — Matthew R Marchewka
(74) *Attorney, Agent, or Firm* — Sterne, Kessler, Goldstein & Fox P.L.L.C.

(57) ABSTRACT

An article of footwear includes an upper and a sole coupled to the upper. The article of footwear includes an inflation system. The inflation system includes an inflatable bladder, a pump in fluid communication with the bladder, and a control circuitry operatively linked to the pump. The pump adjusts the air pressure of the inflatable bladder. The control circuitry receives a command signal from a remote device, and upon receipt of the command signal, the control circuitry transmits an actuation signal to the pump to adjust the air pressure of the inflatable bladder.

6 Claims, 19 Drawing Sheets

(56) References Cited

U.S. PATENT DOCUMENTS

| | | | |
|---|---|---|---|
| 7,337,560 B2 | 3/2008 | Marvin et al. | |
| 9,687,045 B2 | 6/2017 | Leary et al. | |
| 10,051,919 B2 | 8/2018 | Leary et al. | |
| 10,251,450 B2 | 4/2019 | Marvin et al. | |
| 2005/0132617 A1* | 6/2005 | Potter | A43B 3/34 36/29 |
| 2009/0158622 A1* | 6/2009 | Cook | A43B 1/0036 36/35 B |
| 2010/0192410 A1* | 8/2010 | Marvin | A43B 23/07 36/35 B |
| 2013/0227857 A1* | 9/2013 | Schindler | A43B 23/029 36/83 |
| 2014/0165427 A1* | 6/2014 | Molyneux | A43B 21/26 36/102 |
| 2016/0219967 A1* | 8/2016 | Smith | F21V 33/0008 |
| 2016/0374171 A1* | 12/2016 | Wilken | A43B 3/36 |
| 2017/0280682 A1* | 10/2017 | Ruetenik | A01L 5/00 |
| 2018/0289096 A1* | 10/2018 | Mo | A43B 3/0015 |
| 2019/0000183 A1* | 1/2019 | Mou | A43B 3/0015 |
| 2019/0000186 A1* | 1/2019 | Mou | F04B 45/047 |
| 2019/0053572 A1* | 2/2019 | Patton | A43B 3/0005 |
| 2019/0110557 A1 | 4/2019 | Hobson et al. | |
| 2019/0200700 A1* | 7/2019 | Hale | A43B 13/189 |
| 2019/0269202 A1 | 9/2019 | Marvin et al. | |
| 2019/0365042 A1* | 12/2019 | Weast | A43B 3/0015 |
| 2020/0297072 A1* | 9/2020 | Jacob | A43B 3/0005 |

\* cited by examiner
† cited by third party

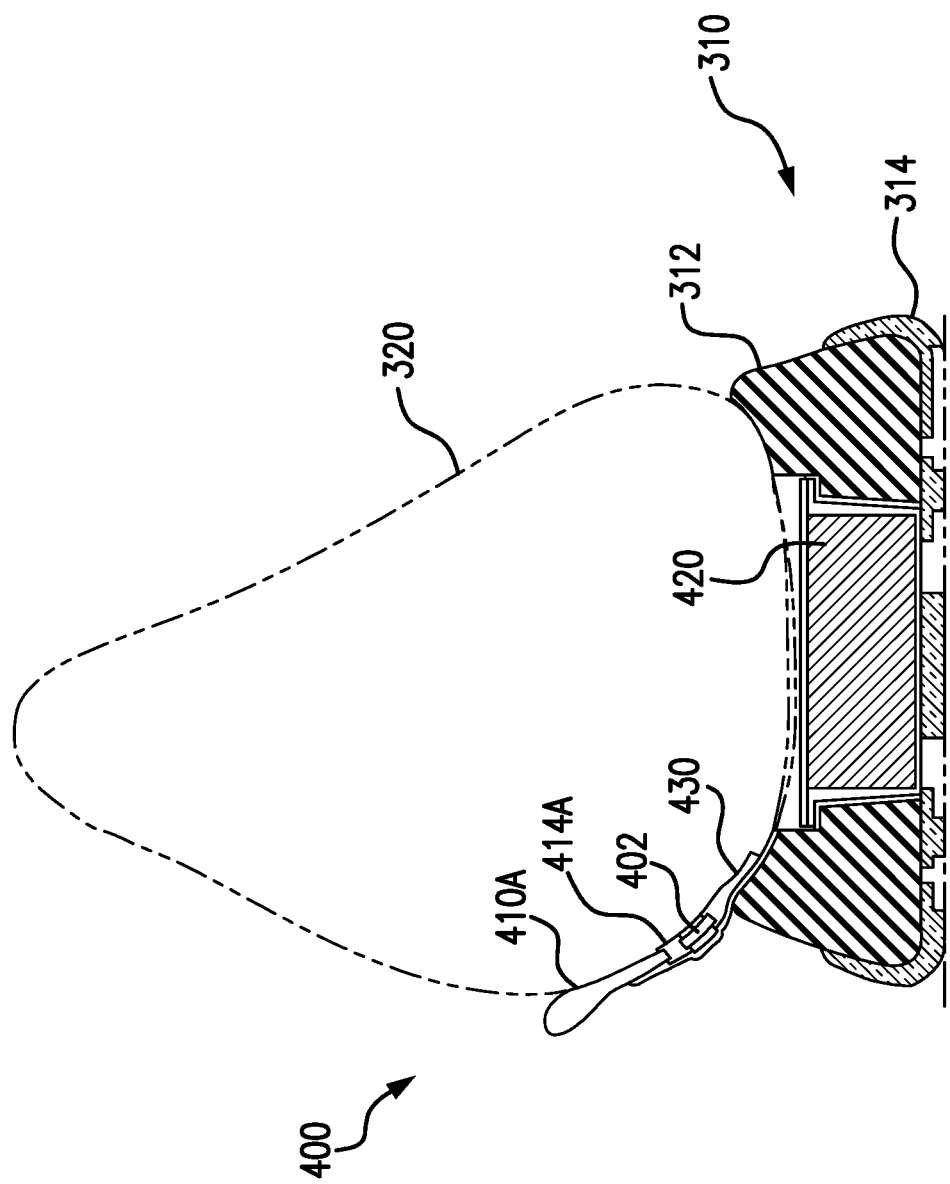

AUTOMATIC INFLATION PUMP BLADDER SYSTEM

BACKGROUND

Field of the Invention

The present disclosure relates to footwear, and more particularly relate to an automatic inflation pump bladder system.

Background

Articles of footwear typically include an upper and a sole, and are sold in a variety of sizes according to the length and width of the foot. However, even feet of similar length do not necessarily have the same geometry. Therefore, the upper may be adjustable to accommodate various foot contours. Such adjustment may include medial and lateral side portions which, when tensioned, provide support to the foot. In addition, the upper may include an ankle portion which encompasses a portion of the ankle region of the foot and thereby provides support thereto.

One common way to adjust the size of a shoe is through lacing. Lacing alone, however, suffers from several disadvantages, for example, when the shoe laces or strap is drawn too tightly, the fastening system can cause pressure on the instep of the foot. Such localized pressure is uncomfortable to the wearer and can make it difficult for the shoe to be worn for prolonged periods of time. Furthermore, while such fastening systems allow the upper of the shoe to be adjustable to accommodate varying foot and ankle configurations, they do not necessarily mold to the contour of individual feet. Moreover, regardless of how much tension is exerted on the medial and lateral side portion, there still remain areas of the foot which are not supported by the upper, due to the irregular contour of the foot. Avoiding displacements between the footwear and the foot results in less strain on the ankle and other parts of the foot.

Accordingly, there is a need for an improved closure system for an article of footwear that automatically allows a bladder to conform the article's upper against the wearer's foot, thereby providing a better fit.

While the human foot possesses natural cushioning and rebounding characteristics, the foot alone is incapable of effectively overcoming many of the forces encountered during every day activity. Unless an individual is wearing shoes which provide proper cushioning and support, the soreness and fatigue associated with every day activity is more acute, and its onset accelerated. The discomfort for the wearer that results may diminish the incentive for further activity. Equally important, inadequately cushioned footwear can lead to injuries such as blisters; muscle, tendon and ligament damage; and bone stress fractures. Improper footwear can also lead to other ailments, including back pain.

Therefore, a continuing need exists for innovations in providing cushioning to articles of footwear.

BRIEF SUMMARY OF THE INVENTION

The present disclosure includes various embodiments of an article of footwear.

In accordance with one embodiment, an article of footwear comprises a sole; an upper coupled to the sole; and an inflation system. In some embodiments, the inflation system comprises an inflatable bladder; a pump in fluid communication with the bladder, the pump configured to adjust the air pressure of the inflatable bladder; and a control circuitry operatively linked to the pump, the control circuitry configured to transmit a first actuation signal to the pump such that pump adjusts the air pressure of the inflatable bladder, wherein the control circuitry is configured to receive a command signal from a remote device, and upon receipt of the command signal, the control circuitry transmits the first actuation signal to the pump to adjust the air pressure of the inflatable bladder.

In some embodiments, the command signal represents a target air pressure level, and upon receipt of the command signal, the control circuitry is configured to transmit the first actuation signal to the pump such that the pump adjust the air pressure of the inflatable bladder to the target air pressure level.

In some embodiments, wherein the inflation system comprises a pressure sensor configured to transmit a measurement signal to the control circuitry, the measurement signal representing the measured air pressure of the inflatable bladder. In some embodiments, the control circuitry is configured to transmit a data signal to the remote device, the data signal indicating the measured air pressure of the inflatable bladder. In some embodiments, the control circuitry is configured to receive the command signal from the remote device and transmit the data signal to the remote device according to a short-range wireless technology standard, such as BLUETOOTH® or BLUETOOTH LOW ENERGY® standard.

In some embodiments, the inflation system comprises an extension defining an air passage connected to the pump and the inflatable bladder, and the pressure sensor is coupled to the extension. In some embodiments, wherein the inflation system comprises: a foot-detection sensor configured to transmit a presence signal to the control circuitry, the presence signal indicating when a wearer's foot is received in the article of footwear, wherein upon receipt of the presence signal, the control circuitry transmits a second actuation signal to the pump to increase the air pressure of the inflatable bladder.

In some embodiments, wherein the pump comprises: a displacement member configured to rotate or reciprocate to adjust the air pressure of the inflatable bladder; and a motor configured to drive rotation or reciprocation of the displacement member upon receipt of the first actuation signal such that the displacement member adjusts the air pressure of the inflatable bladder. In some embodiments, the inflation system comprises a pump input transducer coupled to the upper and operatively linked to the pump, the pump input transducer configured to upon the application of force against the pump input transducer.

In some embodiments, wherein the inflation system comprises: a display coupled to the article of footwear and operatively linked to the control circuitry, the display configured to generate a visual indicator representing a status of the inflatable bladder. In some embodiments, a display input transducer coupled to the upper and operatively linked to the display, the display input transducer configured to actuate the display upon the application of force against the display input transducer.

In some embodiments, the inflatable bladder is disposed on the upper, and the inflatable bladder is configured to conform at least a portion of the upper against the wearer's foot. In some embodiments, the inflatable bladder is disposed in the sole of the upper.

In accordance with one embodiment, an article of footwear comprises a sole; an upper coupled to the sole; and an inflation system. In some embodiments, the inflation system comprises a set of inflatable tubes disposed on the upper; a pump in fluid communication with the set of tubes, the pump configured to adjust the air pressure of the tubes; a foot-detection sensor configured to transmit a foot presence signal indicating when a wearer's foot is received in the article of footwear; and a control circuitry operatively linked to the pump and the foot-detection sensor, the control circuitry configured to transmit an actuation signal to the pump such that pump adjusts the air pressure of the tubes, wherein the control circuitry is configured to receive the foot presence signal foot-detection sensor, and upon receipt of the foot presence signal, the control circuitry transmits the first actuation signal to the pump to increase the air pressure of the inflatable bladder.

In some embodiments, the set of inflatable tubes include a first inflatable tube extending across a throat region of the article of footwear and a second inflatable tube extending across a heel region of the article of footwear.

The present disclosure includes various embodiments of a computer readable medium storing instructions for executing a method performed by a processor.

In accordance with one embodiment, the method includes obtaining a first air pressure measurement of an inflatable bladder disposed on an article of footwear; calculating a pressure differential between the air pressure measurement of the bladder and a reference air pressure level; determining whether the calculated pressure differential is within a predetermined tolerance of the reference air pressure level; calculating an air pressure adjustment for the bladder based on the calculated pressure differential; and actuating a pump disposed on the article of footwear to adjust the air pressure of the bladder based on the calculated air pressure adjustment.

In some embodiments, the reference air pressure level is inputted by a user. In some embodiments, the reference air pressure level is determined based on a type of activity inputted by a user, and the type of activity is selected from a group consisting of running, walking, training, jumping, and participating in an athletic event. In some embodiments, the reference air pressure level is determined by: obtaining a plurality of air pressure measurements of the inflatable bladder associated with a period of time; calculating a desired air pressure level for the bladder using the plurality of air pressure measurements associated with the period of time; and setting the desired air pressure level as the reference air pressure level.

In some embodiments, the method further comprises: determining whether a wearer's foot is received in the article of footwear; and actuating the pump disposed on the article of footwear to inflate the bladder when determining that a wearer's foot is received in the article of footwear.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

FIG. 16 shows a lateral side cross-section view of an article of footwear according to embodiments.

DETAILED DESCRIPTION OF THE INVENTION

Figure 1:
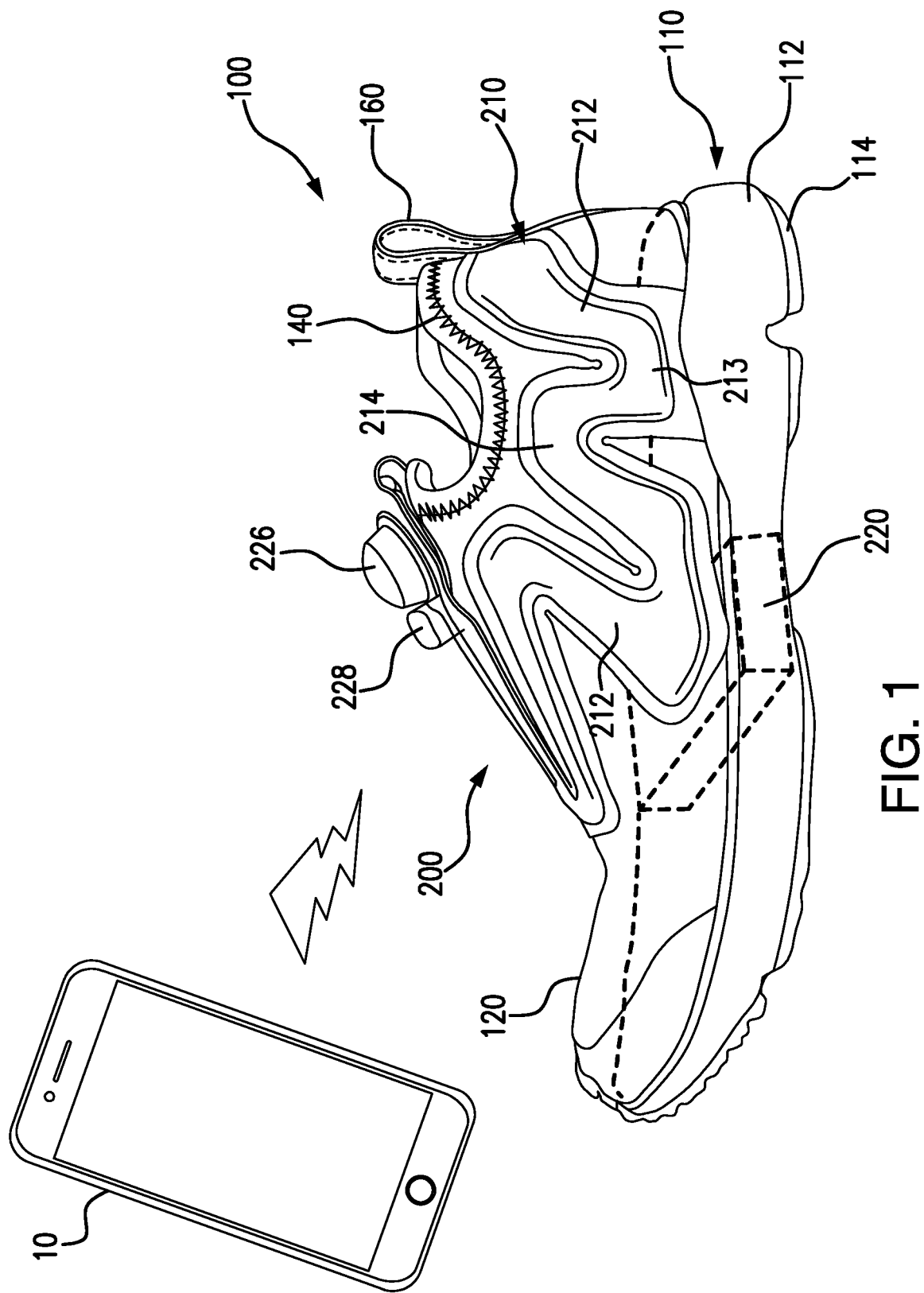
FIG. 1 shows an isolation lateral side view of an article of footwear paired with a remote device according to embodiments.

The present inventions will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present inventions. Other suitable modifications and adaptations of the variety of conditions and parameters normally encountered in the field, and which would be apparent to those skilled in the art, are within the spirit and scope of the inventions.

One attempt over the years to improve fit and comfort of shoes is incorporating an inflatable bladder over the shoe's upper. Mechanisms used to inflate or deflate the bladder are usually manually operated by the wearer. For example, the wearer typically must manually apply force to a piston-pump to inflate the bladder, or the wearer typically must open a release valve to deflate the bladder. However, manually operating pumps or release valves is normally not as responsive as using an automated controller to adjust the air pressure of the bladder. Accordingly, over time, the manually-controlled bladder is not typically set at a proper air pressure for providing adequate support for a wearer's foot.

While there have been some attempts to incorporate automated inflation systems into an article of footwear, previous automated inflations systems do not include an automated pump to adjust the air flow of the bladder. Accordingly, conventional automated inflation systems lack precise control of the air pressure of the inflatable bladder and do not respond in the time needed when using an article of footwear in athletic activity.

Accordingly, there is a need for an improved automated inflation system for an article of footwear that controls the air pressure of an inflatable bladder or tube precisely and promptly, thereby providing a better fit for the wearer's foot.

According to various embodiments described herein, the article of footwear of the present disclosure may overcome one or more of the deficiencies noted above by comprising a sole, an upper coupled to the sole, and an inflation system. In some embodiments, the inflation system may include an inflatable bladder; a pump in fluid communication with the bladder, and a control circuitry operatively linked to the pump. In some embodiments, the pump is configured to adjust the air pressure of the inflatable bladder. In some embodiments, the control circuitry is configured to transmit a first actuation signal to the pump such that pump adjusts the air pressure of the inflatable bladder. In some embodiments, the control circuitry is configured to receive a first command signal from a remote device, and upon receipt of the first command signal, the control circuitry transmits the first actuation signal to the pump to adjust the air pressure of the inflatable bladder.

An athletic shoe 100, as illustrated, for example, in FIGS. 1-11, is an embodiment of the article of footwear. Athletic shoe 100 may comprise a running shoe, a training shoe, a basketball shoe, or any other suitable athletic shoe. Although athletic shoe 100 is primarily described, other embodiments envision the present invention utilized in other types of footwear, including, but not limited to, non-athletic footwear, and sandals. Moreover, although FIGS. 1-4 depict a shoe for use on the left foot of a wearer, the principles of the present invention are equally applicable to shoes intended for use on the right foot.

In various embodiments, athletic shoe 100 may include a heel region 101, a midfoot or arch region 102, and a forefoot region 103 extending between a lateral side 104 and a medial side 105 of athletic shoe 100. In various embodiments, as shown in FIG. 1, for example, athletic shoe 100 may include a sole 110 and an upper 120 coupled to sole 110.

In various embodiments, sole 110 may have various characteristics, such as absorbing shock, protecting a wearer's foot, and providing traction with each foot strike. In some embodiments, as shown in FIG. 1, for example, sole 100 may include an outsole 114, a midsole 112, and an insole or sockliner. In some embodiments, sole 110 may be constructed of any materials suitable for absorbing shock and providing cushion. In some embodiments, the materials used for the outsole 114, midsole 112, and an insole may be different from each other or the same. In some embodiments, for example, the outsole 114 may comprise a material that is abrasion resistant, such as rubber. In some embodiments, midsole 112 may be comprised of a foam-based material, such as ethyl vinyl acetate (EVA) foam or foamed polyurethane.

In various embodiments, upper 120 is configured to receive and surround a wearer's foot when disposed on sole 110. In some embodiments, upper 120 may be attached to sole 110 by stitching, an adhesive, or other suitable fasteners. In some embodiments, upper 120 includes one or more flexible layers 130. In some embodiments, flexible layer 130 may be comprised of a flexible material. In some embodiments, flexible layer 130 may be comprised of a stretchable textile with multi-dimensional stretch. In some embodiments, flexible layer 130 may include a fabric comprising elastane, such as LYCRA®. In some embodiments, flexible layer 130 may be comprised of a mesh material.

In some embodiments, each flexible layer 130 may be made from the same material. In some embodiments, one flexible layer 130 may be made from a different material than another flexible layer 130. In some embodiments, each flexible layer 130 has the same properties. In some embodiments, one flexible layer 130 may have different properties than another flexible layer 130 (e.g., flexible layer 130 closest to the wearer's foot may have a finer mesh than flexible layer 130 visible from outside of the upper 120). In some embodiments, flexible layer 130 may have different properties in different regions of upper 120 (e.g., finer mesh in a heel region than in a vamp region).

In some embodiments, upper 120 may include a collar 140 that defines an opening for receiving the wearer's foot within upper 120. In some embodiments, upper 120 may include a toe cap to provide additional support and/or protection to the wearer's foot in the toe region. In some embodiments, upper 120 may include a heel counter 160 to provide additional support and/or protection to the wearer's foot in the heel region.

In various embodiments, athletic shoe 100 may include an inflation system 200 that allows a wearer to adjust the cushioning, support, and fit provided by athletic shoe 100 according to personal preference or need for the various activities engaged in by the wearer. In various embodiments, inflation system 200 may also allow a wearer to enhance the aesthetic appeal of athletic shoe 100 by inflating a visual layer that provides a texture or color change along upper 120. In some embodiments, inflation system 200 may include an inflatable bladder 210 and a pumping module 220 for selectively adjusting the air pressure of inflatable bladder 210.

In various embodiments, bladder 210 may be comprised of an elastomeric, resilient material and filled with a fluid such that bladder 210 may expand with the delivery of a fluid and rescind with the release of fluid to adjust fit and support provided by athletic shoe 100. In some embodiments, bladder 210 may be comprised of two or more sheets joined together to enclose a reservoir for storing a fluid. In some embodiments, each sheet may be comprised of a polymeric material, such as thermoplastic elastomer, a thermoplastic polyurethane, polyethylene, polypropylene, neoprene, polyvinylchloride, nitrile rubber, ethylene vinyl acetate, or a combination thereof. Accordingly, utilizing inflatable bladder 210 in athletic shoe 100 reduces the need for additional foam or other padding and pieces, thus providing an easier construction and manufacture of athletic shoe 100 compared to standard padded footwear.

In some embodiments, bladder 210 is filled with ambient air. In some embodiments, bladder 210 may be filled with air set at a pressure above ambient pressure, such as, for example, in a range between 4 psi and 8 psi above ambient pressure. In some embodiments, bladder 210 may be filled with other types of gases, such as helium or nitrogen. In some embodiments, bladder 210 may be filled with a liquid or paste.

In some embodiments, bladder 210 is disposed on any portion of upper 120 so that bladder 210 secures the wearer's foot in athletic shoe 100 and reduces heel slip, for example, by cinching down on the wearer's foot. In some embodiments, bladder 210 draws flexible layer 130 toward the wearer's foot when bladder 210 is inflated such that bladder 210 may tighten flexible layer 130 around the wearer's foot.

In some embodiments, bladder 210 is disposed on an outermost surface of upper 120. In some embodiments, bladder 210 is disposed on an outer surface of flexible layer 130. In some embodiments, inflatable bladder 210 is attached to upper 120 (e.g., flexible layer 130) by stitching, adhesive, bonding, heat sealing, or other suitable fastening method. For example, bladder 210 may be hot melted to flexible layer 130 with an adhesive such that the adhesive forms a layer between flexible layer 130 and bladder 210. In some embodiments, adhesive may include, for example, an ethylene-vinyl acetate copolymer, a polyolefin, a polyamide, a polyester, a polyurethane, or other suitable adhesive. In some embodiments, inflatable bladder 210 may be attached to upper 120 by other methods, such as, for example, RF welding, sonic welding, heat sealing, or other mechanical means.

Figure 2:
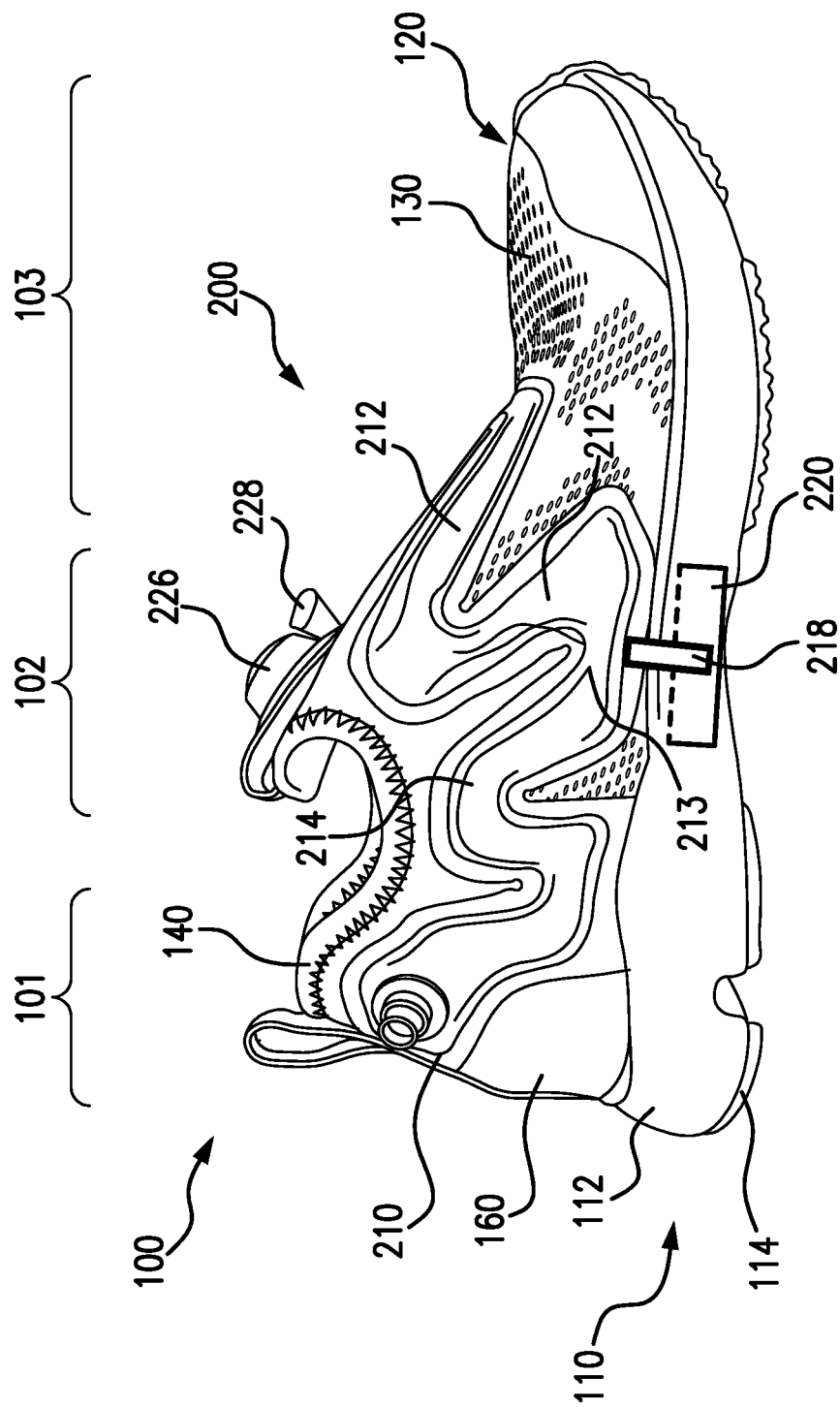
FIG. 2 shows a medial side view of an article of footwear according to embodiments.

In some embodiments, as shown, for example, in FIGS. 1 and 2, bladder 210 may extend from a lateral side in a heel region across a throat region to a medial side in the heel region of athletic shoe 100. In some embodiments, bladder 210 may include a plurality of fluidly connected segments 212. In some embodiments, each segment 212 defines a compartment filled with air. In some embodiments, segments 212 are fluidly connected by lower joints 213 and upper joints 214. In some embodiments, segments 212 are configured to be drawn closer to each other when bladder 210 is inflated, thus compressing bladder 210 around the wearer's foot. In some embodiments, bladder 210 comprises a single fluidly connected inflatable compartment that extends from the lateral side in the heel region across the throat region to the medial side in the heel region. In some embodiments, there is a break in the heel region between the lateral side and the medial side (i.e., no fluid connection), for example, at heel counter 160. In some embodiments, there is no break in the heel region such that inflatable compartment completely surrounds athletic shoe 100 below collar 140.

In some embodiments, bladder 210 forms a zig-zag pattern on upper 120. In some embodiments, the zig-zag pattern is a vertical zig-zag pattern. For example, segments 212 of bladder 210 may extend between collar 140 and sole 110 on the medial side and the lateral side of athletic shoe 100, as shown, for example, in FIGS. 1 and 2. In some embodiments, segments 212 extend away from collar 140 in a throat region towards a vamp region of athletic shoe 100. In some embodiments, lower joint 213 runs along a length of sole 110, as shown, for example, in FIGS. 1 and 2. For example, lower joint 213 may run along a length of an upper edge of sole 110. In some embodiments, the two fluidly connected adjacent segments 212 extend inwardly and upwardly along the outer surface of flexible layer 130. For example, the two fluidly connected adjacent segments 212 may extend toward the collar 140 or throat of upper 120. This configuration may contribute to the cinching action of bladder 210 when bladder 210 is inflated.

In some embodiments, as shown in FIG. 2, for example bladder 210 may include an extension 218 that defines an air passage fluidly connecting bladder 210 to pump module 220. In some embodiments, extension 218 may be formed from two or more polymer sheets joined together to define an air passage there between. In some embodiments, the polymer films may include a thermoplastic polyurethane sheet, mesh-based sheet, or a combination thereof. In some embodiments, extension 218 may be comprised of an injection-molded component formed as a barb connection to bladder 210. In various embodiments, extension 218 may be disposed on any portion of shoe 100 such that extension 218 fluidly connects pump module 220 to bladder 210. In some embodiments, extension 218 may be disposed only on the medial side of athletic shoe 100. In some embodiments, extension 218 may be disposed only on the lateral side of athletic shoe 100. In some embodiments, extension 218 may be disposed on both the lateral and medial side of athletic shoe 100. In some embodiments, extension 218 may be disposed along heel region 101 of athletic shoe 100.

While bladder 210 is primarily discussed as a single bladder, in some embodiments, bladder 210 may include multiple bladders or chambers disposed on upper 120. In some embodiments, the multiple chambers of bladder 210 may be connected by one or more air passages.

While bladder 210 is primarily discussed as being disposed on upper 120, in some embodiments, bladder 210 may be disposed on or within sole 110 of athletic shoe 100 such that bladder 210 provides cushioning support against the bottom of wearer's foot. In some embodiments, bladder 210 may be configured to compress upon the application of force to absorb shock applied during foot strike. In some embodiments, bladder 210 may be disposed above, below, or within midsole 112. In some embodiments bladder 210 may be disposed between midsole 112 and outsole 114. In some embodiments, bladder 210 may form part of the sidewall of sole 110 such that the bladder is exposed along either the lateral side or medial side of athletic shoe 100. In some embodiments, bladder 210 may be disposed along heel region, midfoot region, or toe region of sole 110. In some embodiments, bladder 210 may include a plurality of fluid-filled chambers fluidly connected by one or more fluid passages. In some embodiments, inflation system 200 may include a first bladder disposed on upper 120 and a second bladder disposed on or within sole 110 of athletic shoe 100.

In various embodiments, pump module 220 may be disposed along any portion of athletic shoe 100 and may be operatively coupled to bladder 210 to monitor and adjust the air pressure of bladder 210. In some embodiments, pump module 220 may be disposed in sole 110. For example, as shown in FIGS. 1-4, pump module 220 may be disposed within a cavity of midsole 112 located along midfoot region 102 of athletic shoe 100. In some embodiments, pump module 220 may be disposed within sole 110 located either along heel region 101 or forefoot region 103 of athletic shoe 100. In some embodiments, pump module 220 may be disposed on upper 120. For example, in some embodiments, pump module 220 may be disposed below collar 140 along either on the lateral side or the medial side of athletic shoe 100. In some embodiments, pump module 220 may be disposed along a tongue of athletic shoe 100. In some embodiments, pump module 220 may be disposed on upper 120 along heel region 101 of athletic shoe 100.

In some embodiments, pump module 220 may include a pump 230, a pressure sensor 240, a foot-detection sensor 250, a communication interface 260, a power source 270, a display 280, and a control circuitry 290. In some embodiments, pump module 220 may include other types of sensors (e.g., accelerometers, gyroscopes, pedometers) and other types of electronic components (e.g., a GPS device) for controlling operation of inflation system 200.

Figure 4:
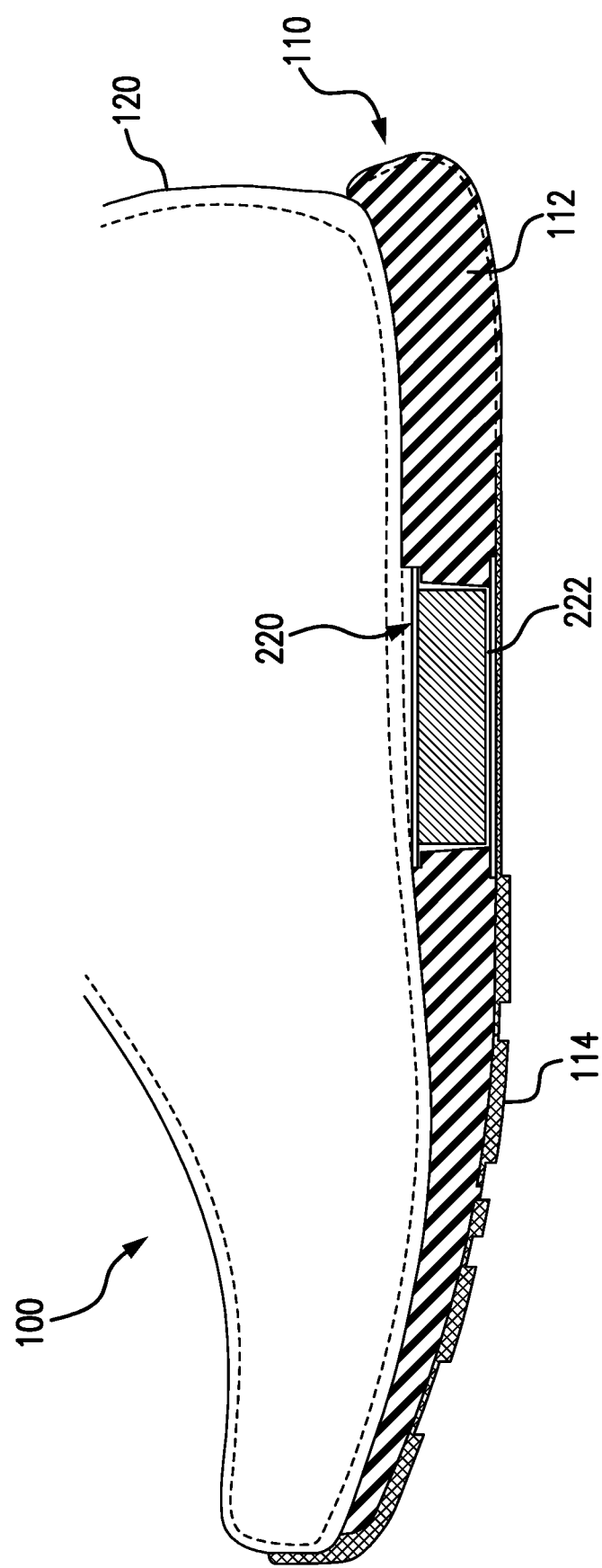
FIG. 4 shows a longitudinal side cross-section view of an article of footwear according to embodiments.
Figure 5:
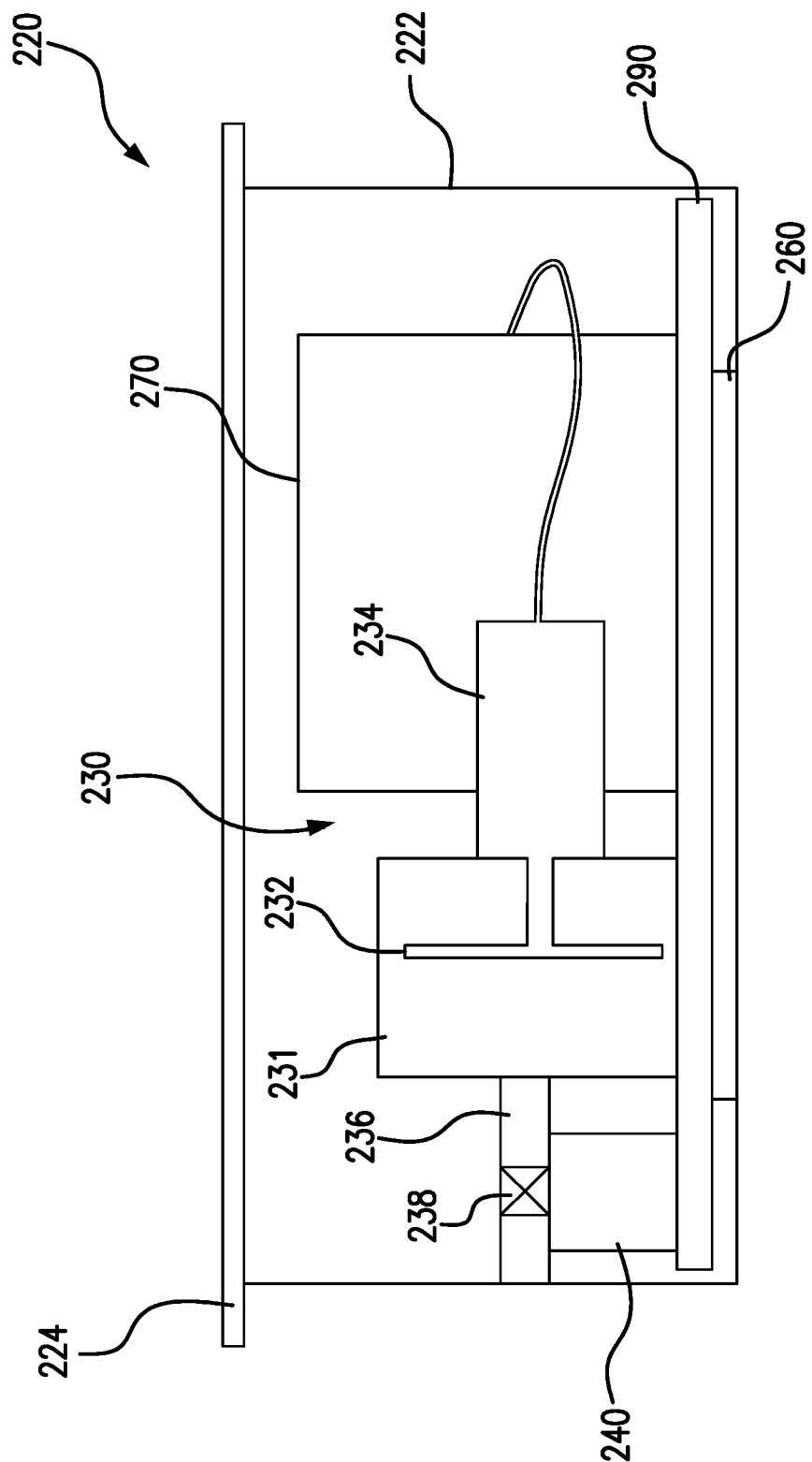
FIG. 5 shows a schematic side view of a pump module of an inflation system according to embodiments.
Figure 6:
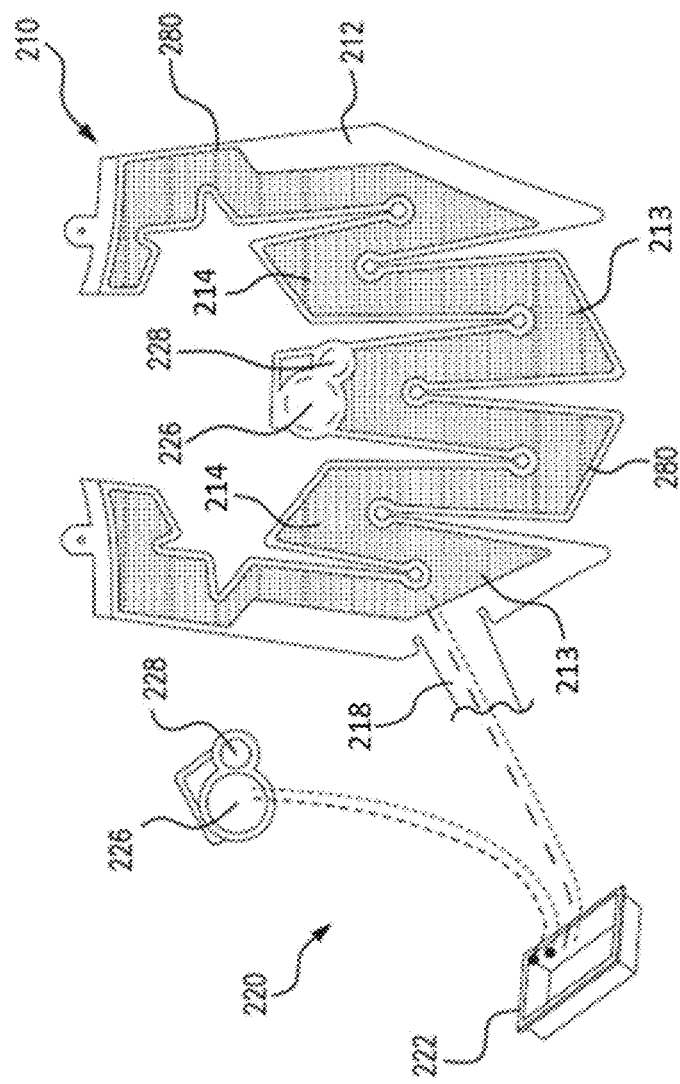
FIG. 6 shows a detailed view of a pump module housing, an inflatable bladder, and a pump transducer according to embodiments.
Figure 7:
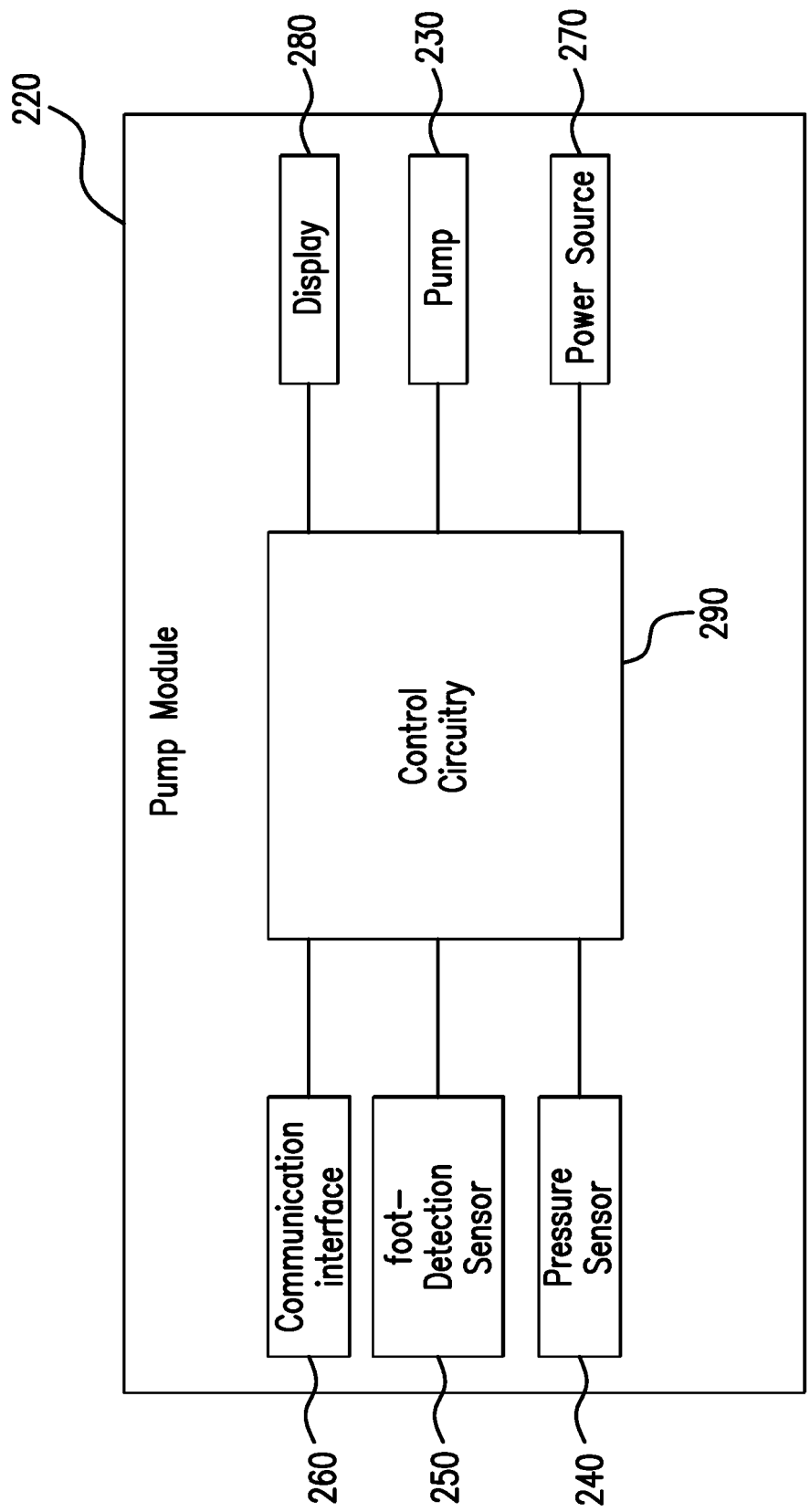
FIG. 7 shows a schematic block diagram of a pump module according to embodiments.

In some embodiments, as shown in FIGS. 4-6, for example, pump module 220 may include a housing 222 for storing pump 230 and control circuitry 290. Housing 222 may further store at least one of pressure sensor 240, foot-detection sensor 250, communication interface 260, and power source 270. In some embodiments, housing 222 may include a bottom wall and one or more sidewalls (e.g., four sidewalls) to define a chamber for storing various components of pump module 220. In some embodiments, housing 222 may be comprised of a molded thermal-polyurethane, injection molded ehylene-vinyl acetate (EVA), polycarbonate, three-dimensional printed medium, etc., which may be attached to any portion of sole 110. In some embodiments, housing 222 may include one or more ports for fluidly connecting pump 230 to an extension of bladder 210 or a tube coupled to bladder 210.

In various embodiment, pump 230 may be in fluid communication with bladder 210 and configured to inflate or deflate bladder 210 to adjust the air pressure of bladder 210. In some embodiments, as shown in FIG. 5, for example, pump 230 may include a pump body 231 (e.g., a cylinder, a casing) configured to hold a volume of fluid (e.g., air). In some embodiments, pump 230 may include a displacement member 232 disposed in pump body 231 and configured to reciprocate or rotate upon the application of rotary movement to displace a bolus of air into or out of the interior of bladder 210. In some embodiments, displacement member 232 may include a diaphragm, a piston, or an impeller. In some embodiments, pump 230 may include a motor 234 coupled to pump body 231 and configured to drive rotation or reciprocation of displacement member 232 such that displacement member 232 displaces the bolus of air in or out of the interior of inflatable bladder 210. In some embodiments, motor 234 is configured to reverse rotary or reciprocating movement of displacement member 232 so that pump 230 may either inflate or deflate bladder 210. In some embodiments, motor 234 may include a micro-motor, an induction motor, a synchronous motor, a brush DC motor, a brushless motor, a variable reluctance motor, a permanent magnet motor, or a piezoelectric motor.

In some embodiments, as shown in FIG. 5, for example, pump 230 may include a tube 236 connecting an outlet of pump body 231 to inflatable bladder 210 so that air may pass from the pump 230 to the interior of bladder 210. In some embodiments, pump 230 may include a pump valve 238 disposed in tube 236 and configured to be set in a closed position when pump 230 is not activated to prevent fluid communication between pump 230 and the interior of bladder 210. In some embodiments, pump valve 238 may be configured to switch from a closed position to an open position when pump 230 is activated to permit fluid communication between pump 230 and the interior of bladder 210. In some embodiments, pump 230 may include a plurality of tubes that fluidly connect pump 230 to multiple bladders 210 so that pump 230 may inflate or deflate multiple bladders 210 simultaneously. In some embodiments, pump 230 may include a first tube fluidly connecting pump body 231 to a first bladder disposed on upper 120 and a second tube fluidly connecting pump body 231 to a second bladder disposed on or within sole 110.

Figure 8:
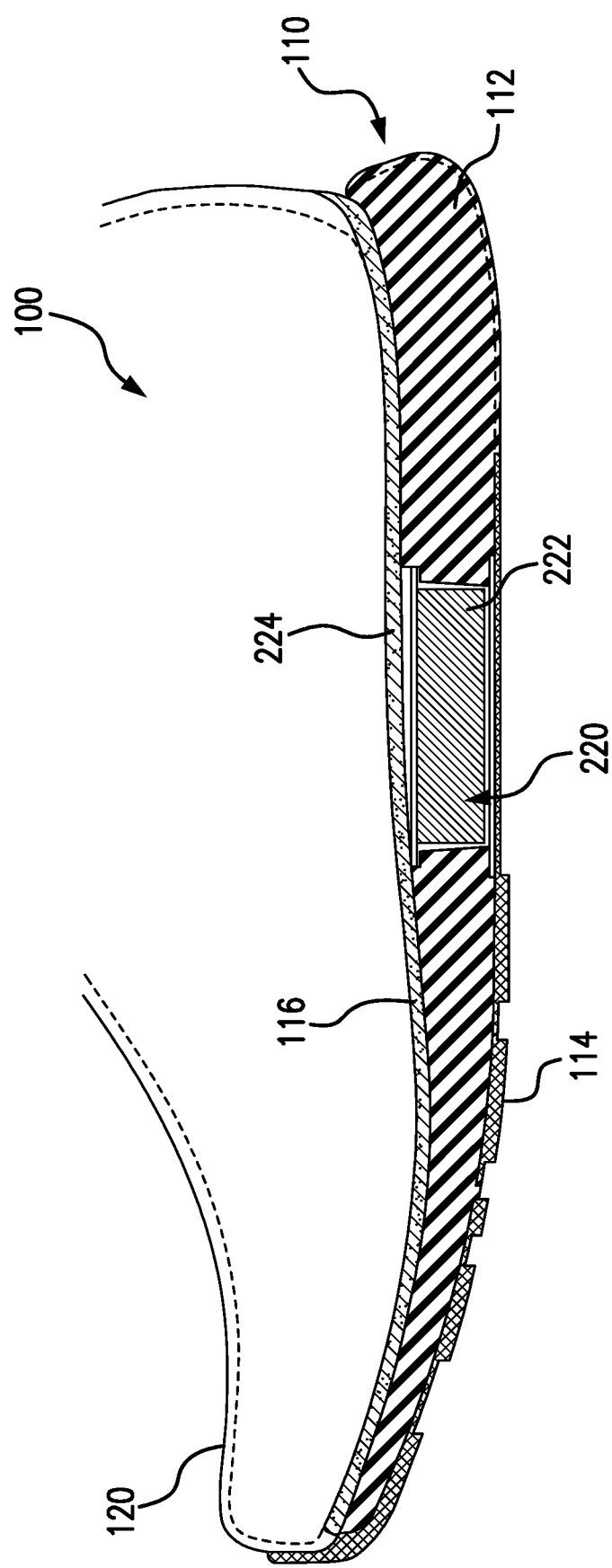
FIG. 8 shows a side cross-section view of an article of footwear according to embodiments.
Figure 9:
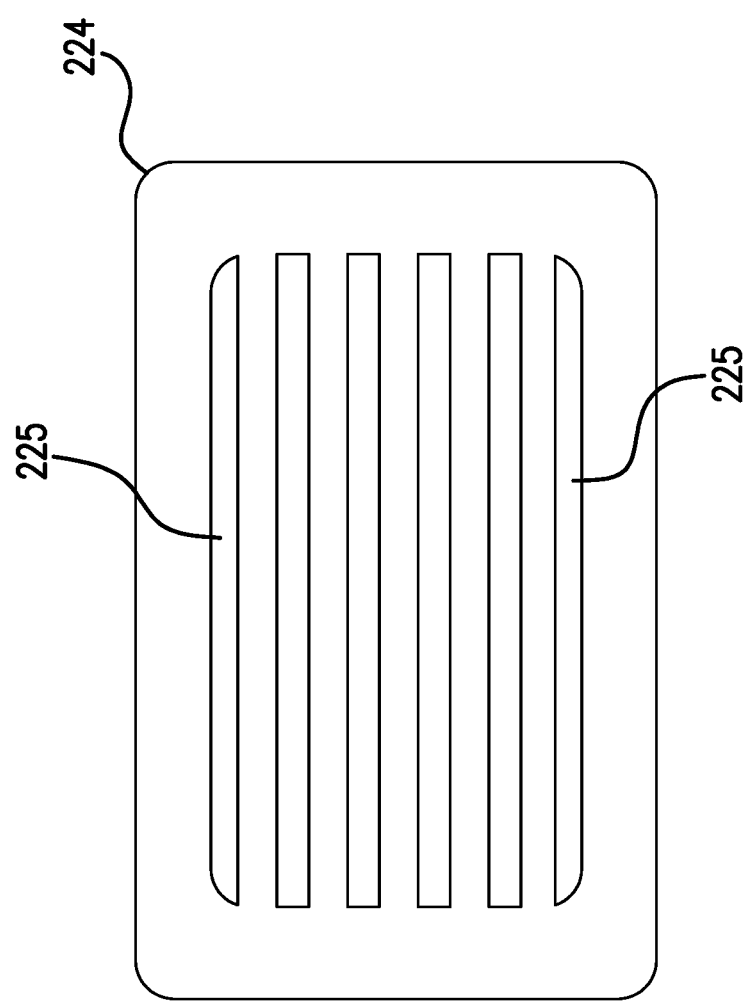
FIG. 9 shows a top schematic view of a lid for a pump module housing according to embodiments.
Figure 10:
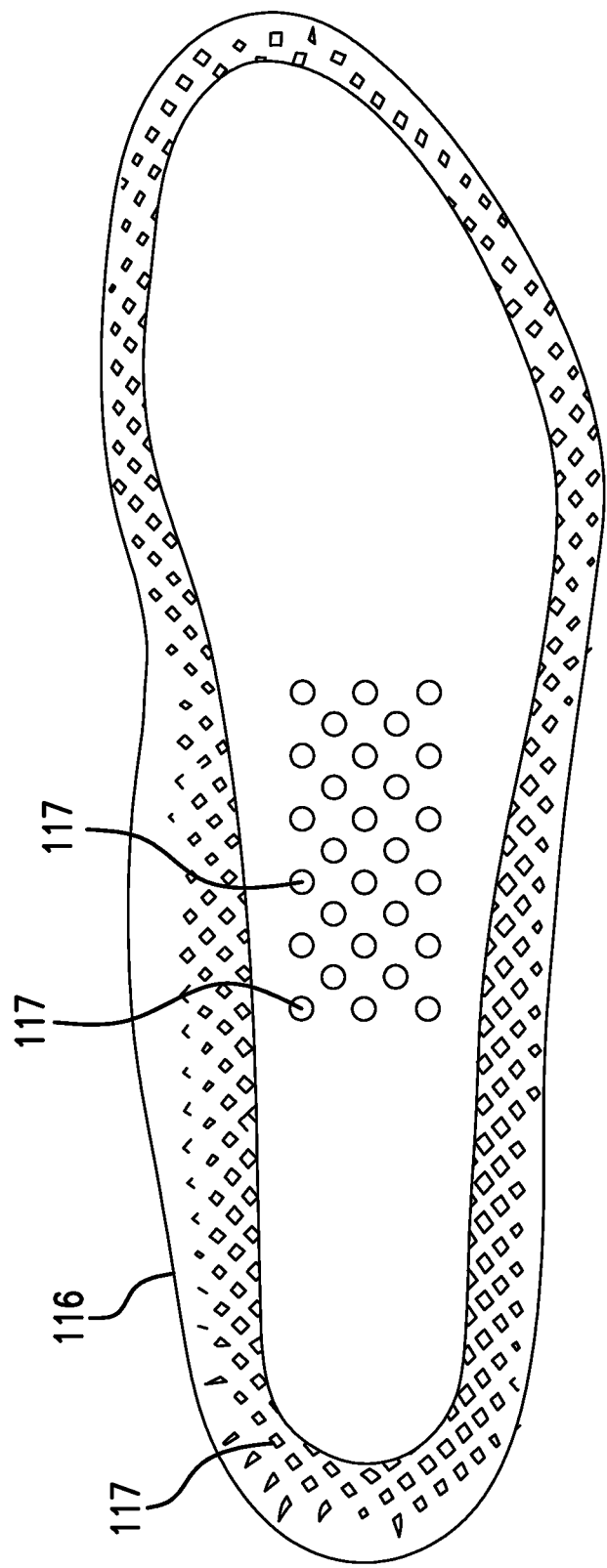
FIG. 10 shows a top view of a sockliner for an article of footwear according to embodiments.
Figure 11:
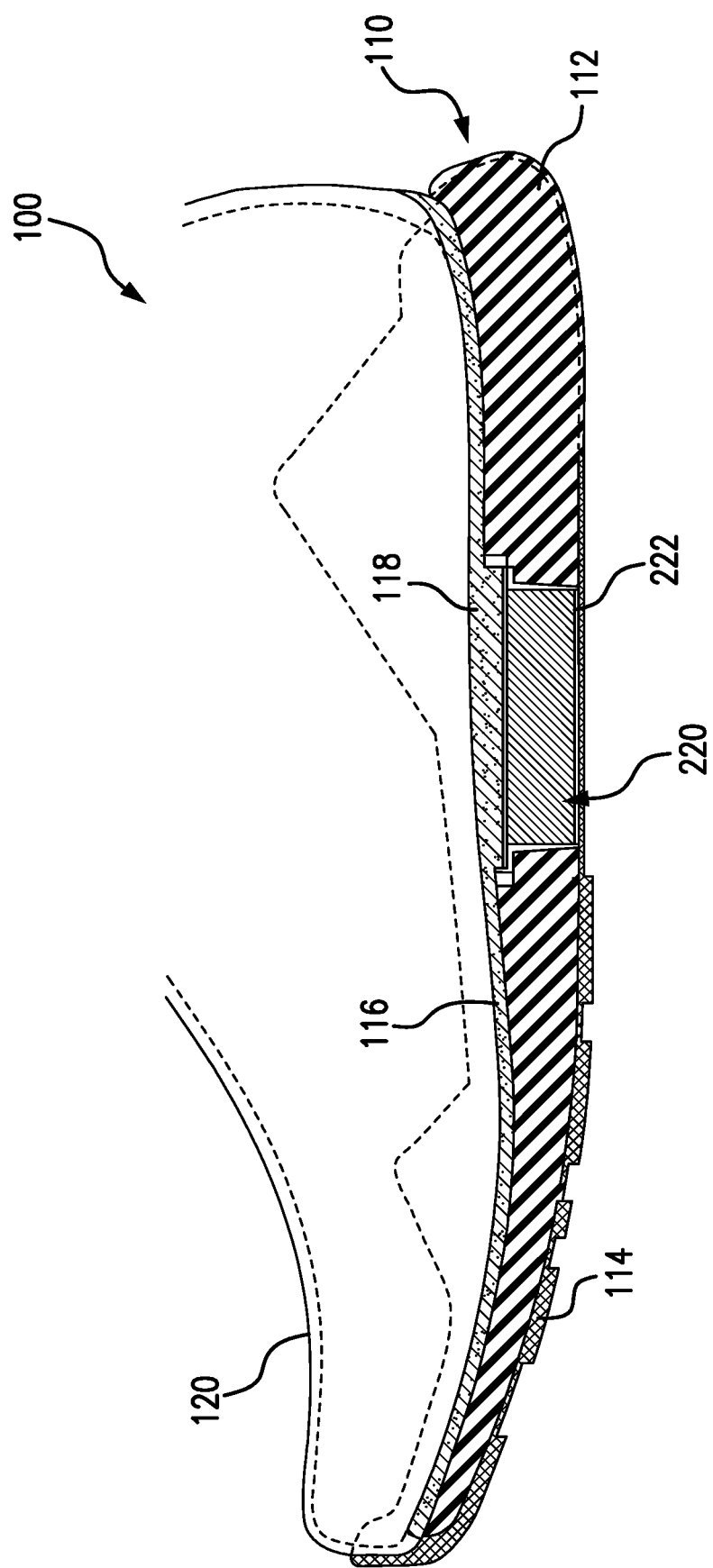
FIG. 11 shows a side cross-section view of an article of footwear according to embodiments.

In some embodiments, as shown in FIGS. 8 and 9, for example, housing 222 of pump module 220 may include a lid 224 disposed flush along an upper surface of midsole 112 and comprising one or more slots 225 to promote air flow to pump 230. In some embodiments, the one or more slots 225 may include any shape (e.g., circle, oval) and size (e.g., small or large perforated holes) configured to promote air flow to pump 230. In some embodiments, lid 224 may include a soft film or filter material configured to permit air to pass therethrough but obstruct moisture/dirt from permeating therethrough. In some embodiments, as shown in FIGS. 8 and 10, for example, athletic shoe 100 may comprise a sockliner 116 disposed against upper surface of midsole 112 and conforming to the bottom of the wearer's foot. In some embodiments, sockliner 116 comprises a plurality of perforations 117 disposed over lid 224 of housing 222 to promote air flow to pump 230. In some embodiments, as shown in FIG. 11, sockliner 116 may comprise a sheet of added padding 118 disposed over housing 222 to provide extra cushioning to the wearer's foot. In some embodiments, sockliner 116 is comprised of EVA or other suitable materials for providing cushioning to wearer's foot. In some embodiments, sockliner 116 may include a thin molded plate co-molded or cemented to the sheet of added padding 118 to absorb any shock directed against pump module 220 generated through foot strike motion.

In some embodiments, pressure sensor 240 may be operatively connected to control circuitry 290 (e.g., directly connected or through electrical wiring) and configured to measure the air pressure of bladder 210. In some embodiments, pressure sensor 240 may be configured to transmit a measurement signal representing the measured air pressure of the inflatable bladder to control circuitry 290. In some embodiments, pressure sensor 240 may be configured to sample air pressure measurements of bladder 210 often enough (e.g., at least once every second) to indicate how the air pressure of bladder 210 is changing while being used by a wearer or while being adjusted by pump 230.

In some embodiments, pressure sensor 240 may be an absolute pressure sensor, a gauge pressure sensor, or a differential pressure sensor. In some embodiments, pressure sensor 240 may measure air pressure through electrical resistance (e.g., using a strain-gauge coupled to a resistor to measure pressure changes by change in resistance), capacitance (e.g., using a pair of flexible plates separated by a dielectric to measure pressure changes by change in capacitance), or inductance (e.g., using a diaphragm coupled to a metal core to measure pressure changes by change in induced current). In various embodiments, pressure sensor 240 may be disposed on any portion of athletic shoe 100. In some embodiments, as shown in FIG. 5, for example, pressure sensor 240 may be disposed in housing 222 and coupled to tube 236 of pump 230. In some embodiments, pressure sensor 240 may be coupled to bladder 210. In some embodiments, pressure sensor 240 may be arranged downstream of pump 230 and upstream of bladder 210.

In some embodiments, foot-detection sensor 250 may be operatively connected to control circuitry 290 (e.g., directly connected or through electrical wiring) and configured to detect when a wearer's foot is received in athletic shoe 100. In some embodiments, foot-detection sensor 250 may be configured to transmit a presence signal indicating when a wearer's foot is received in athletic shoe 100 to control circuitry 290. In some embodiments, foot-detection sensor 250 may be a thermal sensor configured to detect heat transferred from a wearer's foot when received in athletic shoe 100. In some embodiments, foot-detection sensor 250 may be a pressure sensor configured to detect pressure applied by wearer's foot when received in athletic shoe 100.

In various embodiments, communication interface 260 is operatively linked to control circuitry 290 and configured to electronically communicate (e.g., via a wireless and/or wired connection) data and power with an external device (e.g., charging pad, a mobile device). In some embodiments, communication interface 260 may include an inductor configured to generate a current from an applied magnetic field to power control circuitry 290 or communicate information. In some embodiments, the inductor of communication interface 260 may generate a current or communicate information by using Near Field Communication (NFC). In some embodiments, the inductor of the communication interface 260 may comprise a metal coil, such as, for example, a copper coil. In some embodiments, communication interface 260 may include an antenna configured to receive and transmit radio frequency signals with an external device (e.g., a mobile device) according to various wireless communication protocols, such as a short-range wireless technology standard, such as an Advanced and Adaptive Network Technology (ANT™) standard, a BLUETOOTH® or A BLUETOOTH LOW ENERGY® (BLE) standard (e.g., BLE 4.0). In some embodiments, the antenna of communication interface 260 may be a ceramic chip antenna, a metal plate antenna, a microstrip patch antenna, a planar Inverted-F antenna, a printed antenna, or a flexible printed antenna. In some embodiments, communication interface 260 may include any type of circuitry components, such as amplifiers, capacitors, voltage regulators, rectifiers, etc., suitable for amplifying, filtering, and regulating signals received or transmitted by the inductor or the antenna.

Figure 12:
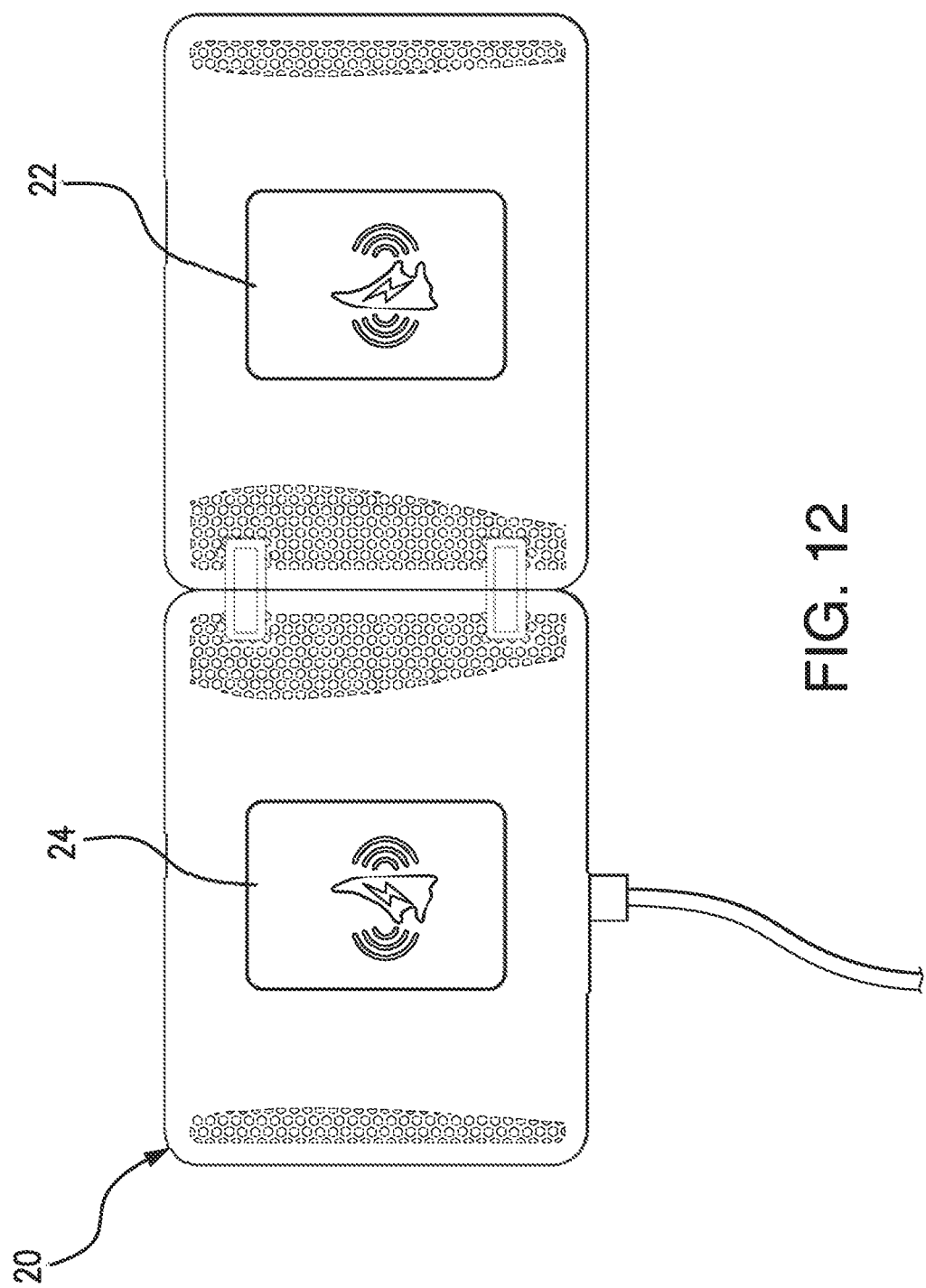
FIG. 12 shows a top view of a charging pad according to embodiments.

In some embodiments, power source 270 is operatively connected to pump 230 and control circuitry 290 and configured to store electrical energy and transmit power to pump 230 and control circuitry 290. In some embodiments, power source 270 may include a rechargeable battery (e.g., lithium-ion battery). In some embodiments, power source 270 may include an input interface, such as, for example, a USB cable connector, for receiving current from an external power source. In some embodiments, power source 270 may be recharged by receiving a current generated by the inductor of communication interface 260 so that power source 270 may be recharged by a remote device (e.g., a charging pad). In some embodiments, as shown in FIG. 12, a charging pad 20 may be operatively linked to communication interface 260 to wirelessly charge battery of power source 270. In some embodiments, charging pad 20 may include a first charging region 22 and a second charging region 24 for receiving a pair of athletic shoes 100. In some embodiments, first and second charging regions 22 and 24 may each include an inductor (e.g., a metal coil) configured to generate and apply a magnetic field to the inductor of communication interface 260 such that communication interface 260 generates a current to recharge power source 270. Accordingly, power source 270 for a pair of athletic shoes 100 may be charged simultaneously by charging pad 20.

Figure 3:
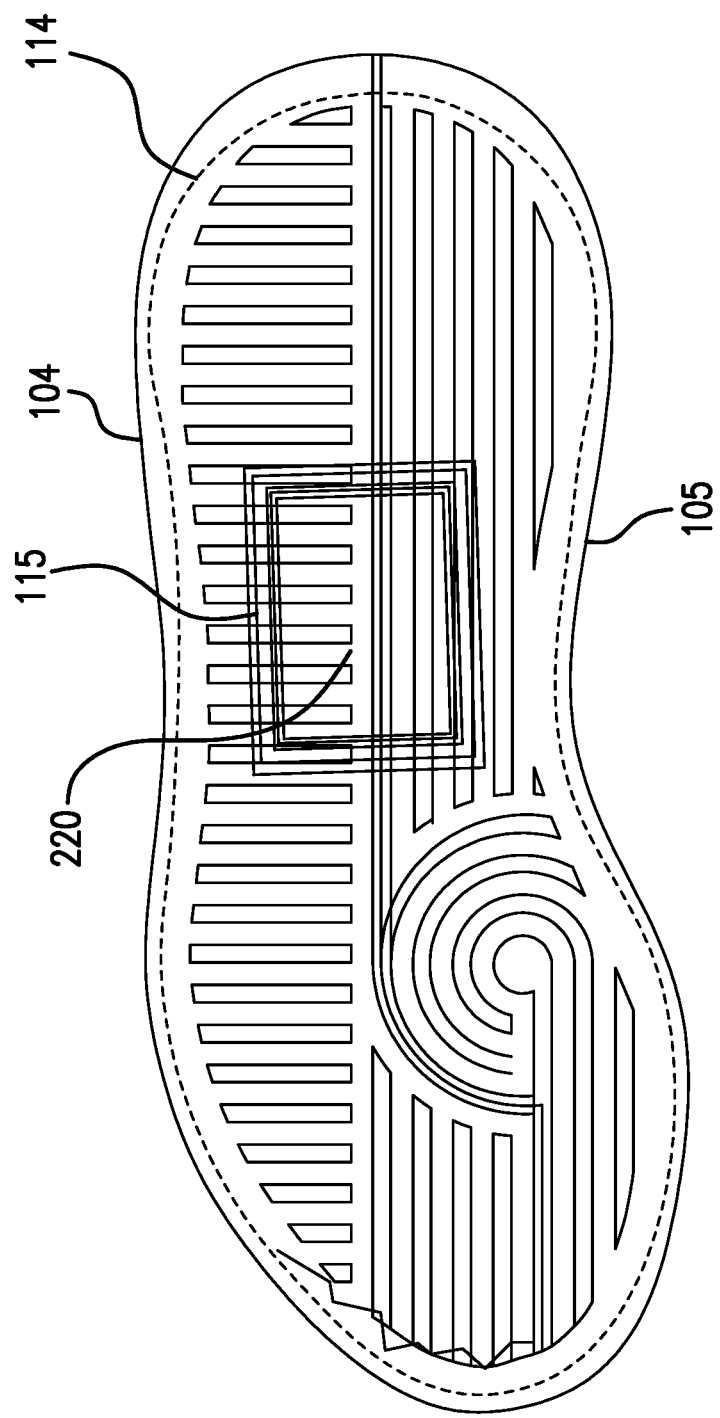
FIG. 3 shows a bottom view of an article of footwear according to embodiments.

In some embodiments, display 280 may be operatively linked to control circuitry 290 and disposed on any portion of athletic shoe 100 to indicate a status of the inflation system 200. In some embodiments, as shown in FIG. 6, for example, display 280 may include a conductive film disposed along bladder 210, such as along the contour of bladder 210 or over segments 212. In some embodiments, the conductive film is configured to illuminate when pump 230 is activated to indicate to a wearer that pump 230 is adjusting the air pressure of bladder 210. In some embodiments, the conductive film may be comprised of a plurality of layers, including a first layer comprised of an indium tin oxide-based material, a second layer comprised of photo luminescent ink-based material (phosphorous ink), a third layer comprised of a dialectic material, and fourth layer of a conductor material. In some embodiments, display 280 may include light emitting diodes (LED) disposed on housing 222 of pump module 220. In some embodiments, as shown in FIG. 3, for example, outsole 114 may include a window 115 aligned with cavity of midsole 112 to expose a bottom of housing 222. In some embodiments, the LED of display 280 is configured to illuminate when pump 230 is activated to indicate to a wearer that pump 230 is adjusting the air pressure of bladder 210. In some embodiments, the LED of display 280 may be disposed on upper 120 and configured to indicate an air pressure measurement of bladder 210.

In various embodiments, control circuitry 290 may include an integrated circuit (e.g., an application specific integrated circuit) operatively linked to various elements of pump module 200, such as pump 230, pressure sensor 240, foot-detection sensor 250, communication interface 260, power source 270, and display 280, to monitor and control operations of inflation system 200. In some embodiments, control circuitry 290 may include a semiconductor substrate (e.g., printed circuit board) and analog and/or digital circuitry components fabricated in the semiconductor substrate. In some embodiments, as shown, in FIG. 5, pump 230, pressure sensor 240, foot-detection sensor 250, and communication interface 260 may be directly coupled to semiconductor substrate of control circuitry 290.

In some embodiments, control circuitry 290 may include a processor (e.g., a microprocessor, a multi-core processor, a central processing unit) configured to receive signals transmitted from pressure sensor 240, foot-detection sensor 250, and communication interface 260 as inputs and generate actuation signals transmitted to pump 230 for adjusting the air pressure of bladder 210 and display 280 for indicating status of inflation system 200. In some embodiments, control circuitry 290 may include input ports for receiving signals transmitted from pressure sensor 240, foot-detection sensor 250, and communication interface 260. In some embodiments, control circuitry 290 may include output ports and actuator circuitry, such as amplifiers, to generate and drive actuator signals to pump 230 and display 280.

In some embodiments, control circuitry 290 may include memory comprising computer storage media in the form of volatile memory, such as random access memory (RAM), and/or nonvolatile memory, such as read-only memory (ROM). In some embodiments, the memory of control circuitry 290 may be configured to store computer readable instructions, data structures, program modules, and other data, which are inputted to the processor for the execution of operations, as described herein. In some embodiments, control circuitry 290 may include any type of circuitry components, such as a bus, for transmitting instructions stored in the memory to the processor.

In some embodiments, as shown in FIGS. 1, 2, and 6, for example, inflation system 200 may include a pump input transducer 226 (e.g., a button) coupled to the upper 120 and operatively linked to the pump 230. In some embodiments, pump input transducer 226 is configured to actuate pump 230 upon the application of force against the pump input transducer 236 so that a wearer may manually adjust the air pressure of bladder 210 without using a remote device. In some embodiments, pump input transducer 226 may be wired to control circuitry 290, and upon pressing pump input transducer 226, control circuitry 290 transmits an actuation signal to pump 230 to adjust the air pressure of bladder 210, such as increasing the air pressure of bladder 210 or releasing all air held within bladder 210 into the atmosphere. In some embodiments, any command generated by pump input transducer 226 may be configured to override any command signal transmitted to control circuitry 290 by a remote device.

In some embodiments, as shown in FIGS. 1, 2, and 6, for example, inflation system 200 may include a display input transducer 228 (e.g., a button) coupled to upper 120 and operatively linked to display 280. In some embodiments, display input transducer 228 is configured to actuate display 280 upon the application of force. In some embodiments, display input transducer 228 may be wired to control circuitry 290, and upon pressing display input transducer 228, control circuitry 290 actuates display 280 to illuminate.

In operation, control circuitry 290 is configured to automatically adjust the air pressure of inflatable bladder 210 in response to receiving inputs from the one or more sensors, such as pressure sensor 240 and foot-detection sensor 250, and command signals from a remote device, such as signals received through communication interface 260. In some embodiments, control circuitry 290 is configured to receive a measurement signal representing the measured air pressure of bladder 210. In some embodiments, upon receiving a measurement signal from pressure sensor 240, control circuitry 290 is configured to determine if the measured air pressure of bladder 210 is within a predetermined tolerance of a reference air pressure. In some embodiments, the predetermined tolerance may range from about 0 PSI to 1.5 PSI, include a range from about 0.0 PSI to about 0.5 PSI for more precise control. In some embodiments, upon determining that measured air pressure exceeds the predetermined tolerance of a reference air pressure, control circuitry 290 is configured to transmit an actuation signal to pump 230 such that pump 230 adjusts the air pressure of bladder 210 based on a difference between the measured air pressure and the reference air pressure.

In some embodiments, control circuitry 290 is configured to receive a presence signal indicating that a wearer's foot is received in athletic shoe 100 from foot-detection sensor 250. In some embodiments, upon receive the presence signal from foot-detection sensor 250, control circuitry 290 is configured to transmit an actuation signal to pump 230 to inflate the air pressure of bladder 210 so that the bladder 210 helps push the wearer's heel toward back of athletic shoe 100. In some embodiments, control circuitry 290 actuates pump 230 to inflate bladder 210 to a predetermined air pressure that is inputted by the wearer. Accordingly, immediately after the wearer's foot is received in athletic shoe 100, control circuitry 290 actuates pump 230 to inflate bladder 210 so that bladder 210 cinches upper 120 to the wearer's foot, thereby securing wearer's foot in athletic shoe 100.

In some embodiments, control circuitry 290 is configured to be set in a rapid release mode, in which control circuitry 290 actuates pump 230 to deflate bladder 210 to a minimal air pressure to allow a wearer's foot to be removed from athletic shoe 100 with minimal effort. In some embodiments, actuation of the pump input transducer 226 (e.g., by double-pressing transducer 226 or depressing transducer 226 for a predetermined period of time) may cause control circuitry 290 to be set in the rapid release mode.

In some embodiments, as shown in FIG. 1, for example, a remote device 10 may be used to pair with pump module 220 to monitor and regulate the air pressure of bladder 210. Remote device 10 may comprise a smartphone, a tablet, a near field communication device, a short-range wireless technology standard device, such as a BLUETOOTH® device, a radio frequency identification (RFID) device, a desktop computer, a smartwatch, or other suitable device. In some embodiments, the memory of remote device 10 may store an autopump application in the form of computer readable instructions so that autopump application may cause remote device 10 to provide a series of graphical control elements or widgets, such as a graphical user interface (GUI), shown on the display of remote device 10.

Figure 13B:
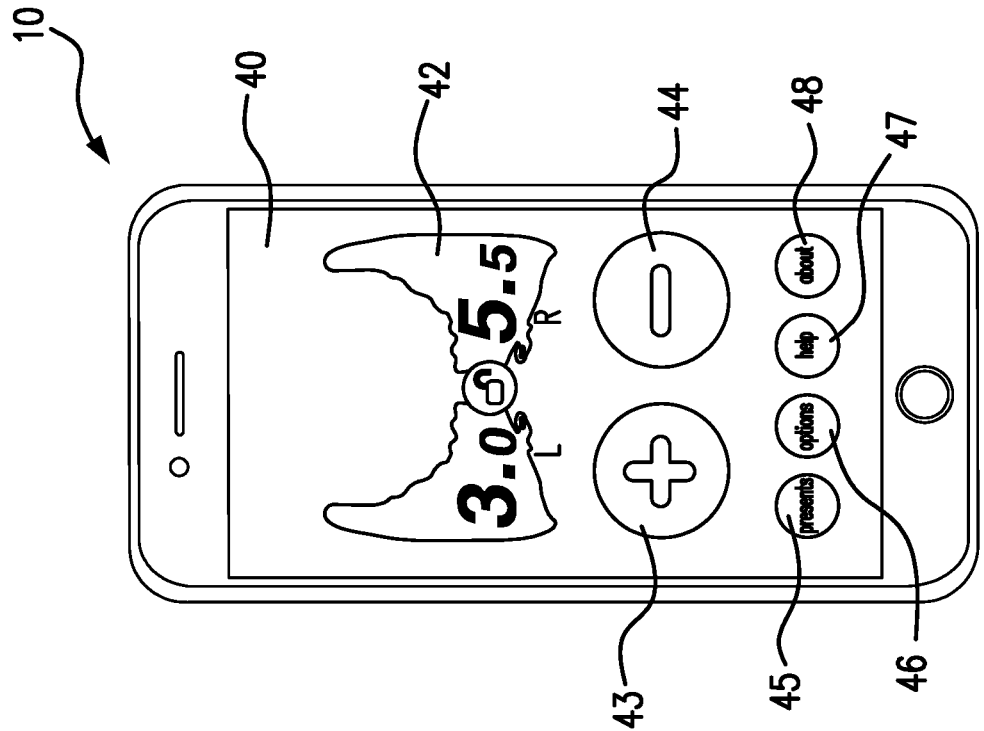
FIG. 13B shows a control screen displayed on a remote device according to embodiments.
Figure 13A:
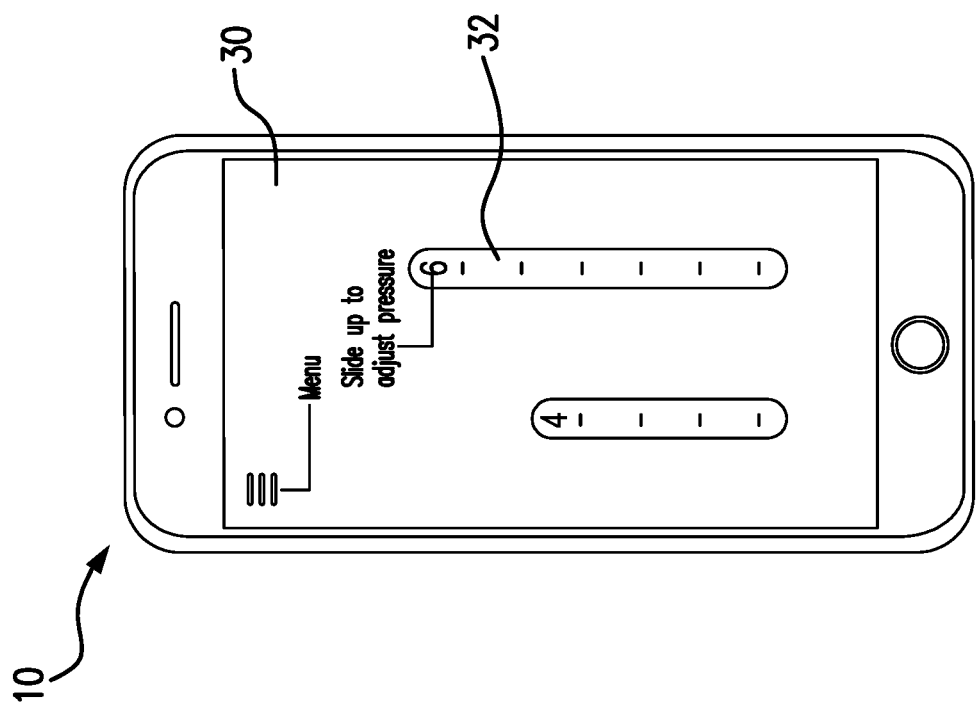
FIG. 13A shows a control screen displayed on a remote device according to embodiments.

In some embodiments, as shown in FIG. 13A, for example, an autopump control screen 30 for display on a GUI of remote device 10 may be generated by executing the autopump application. In some embodiments, autopump control screen 30 may include a bar graph icon 32 indicating a real-time current air pressure level of bladder 210 for each athletic shoe 100. In some embodiments, bar graph icon 32 may be manipulated by applying sliding motion on the display screen to set bladder 210 at a desired air pressure level. Accordingly, upon application of the sliding motion of bar graph icon 32, remote device 10 may send a command signal to control circuitry 290 to actuate pump 230 to adjust the air pressure of bladder 210 according to the desired air pressure level, such as increasing the air pressure to secure the wearer's foot within athletic shoe 100 or releasing the air pressure to assist removing the wearer's foot from athletic shoe 100.

In some embodiments, as shown in FIG. 13B, for example, an autopump control screen 40 for display on a GUI of remote device 10 may be generated by executing the autopump application. In some embodiments, autopump control screen 40 may include a bar graph icon 42 indicating a real-time current air pressure level of bladder 210 for each athletic shoe 100. In some embodiments, autopump control screen 40 may include a pair of adjustment icons 43, 44, including a positive adjustment icon 43 for increasing the air pressure of bladder 210 and a negative adjustment icon 44 for decreasing the air pressure of bladder 210. In response to pressing adjustment icons 43, 44, remote device 10 may send a command signal to control circuitry 290 to actuate pump 230.

In some embodiments, control screen 40 may include a presets icon 45 for allowing a wearer to input desired air pressure levels for bladder 210 and other performance parameters for regulating the air pressure of bladder 210. In some embodiments, control screen 40 may include an options icon 46 for allowing a wearer to input information that may be used to regulate the air pressure of bladder 210. In some embodiments, autopump control screen 40 may include a help icon 47 and an about icon 48 for allowing a wearer to access more information about inflation system 200, such as a trouble shoot information or answers to commonly asked questions by users.

In various embodiments, a wearer may customize regulation of the air pressure of bladder 210 via inputting preferences and personal information through presets icon 45 and options icon 46 of autopump control screen 40. For example, in some embodiments, preset icon 45 or options icon 46 may allow a wearer to select a particular type of activity that the wearer will be participating in while wearing athletic shoe 100. In some embodiments, the type of activity may be selected from a group comprising running, walking, training, jumping, or participating in an athletic event, such as basketball, soccer, or track. In response to receiving the inputted activity by the wearer, remote device 10 may send a command signal to control circuitry 290 to actuate pump 230.

In some embodiments, presets icon 45 or options icon 46 may allow a wearer to input a schedule of activities over a predetermined period of time (e.g., daily schedule or weekly schedule). In response to receiving the inputted schedule by the wearer, remote device 10 may send a command signal to control circuitry 290 to actuate pump 230 at particular times over the predetermined time based on the inputted schedule by the wearer. For example, a wearer may input through either presets icon 45 or options icon 46 a scheduled run time at 6:00 AM every morning and a desired air pressure level for each bladder 210. In response to receiving the inputted scheduled run event, remote device 10 may transmit a command signal to control circuitry 290 to actuate pump 230 to set bladder 210 at the desired air pressure inputted by the wearer at 6:00 AM of each morning. In some embodiments, presets icon 45 and options icon 46 may allow a wearer to input personal information, such as height and weight. Accordingly, in response, remote device 10 may calculate and display an optimal air pressure for bladder 210 based on the inputted personal information by the wearer.

In various embodiments, control circuitry 290 may periodically update remote device 10 the status of bladder 210. For example, in some embodiments, upon receiving the measurement signal, control circuitry 290 is configured to transmit a data signal indicating the measured air pressure of bladder 210 to remote device 10. In some embodiments, remote device 10 may be configured to process the measurement signal through execution of the autopump application. In some embodiments, by processing the measurement signal, remote device 10 may display the current air pressure of bladder 210 to the wearer through autopump control screen 30, 40. In some embodiments, by processing the measurement signal, remote device 10 may generate warnings indicating that the current air pressure of bladder 210 has fallen below a predetermined minimum air pressure level. In some embodiments, by processing the measurement signal, remote device 10 may transmit a command signal representing a target air pressure level to control circuitry 290. In some embodiments, control circuitry 290 may be configured to receive the command signal representing the target air pressure level for bladder 210 from remote device 10. In some embodiments, upon receiving the command signal, control circuitry 290 may be configured to transmit an actuation signal to pump 230 such that pump 230 adjusts the air pressure of bladder 210 to be set at the target air pressure level.

In some embodiments, the autopump application may allow remote device 10 to obtain a plurality of air pressure measurements of bladder 210 associated with a period of time by a wearer and determine an optimal air pressure for the wearer using the plurality of air pressure measurements. Accordingly, the autopump application may be configured to tailor cushion and support provided by bladder 210 to the wearer's foot based on real-time data, thereby ensuring optimal comfort for the wearer.

FIGS. 14-17B illustrate an athletic shoe 300 according to one embodiment of the present disclosure. Similar to the athletic shoe 100 shown in FIGS. 1-11, athletic shoe 300 may include a sole 310 comprising a midsole 312 and an outsole 314 and an upper 320 coupled to sole 310. In various embodiments, athletic shoe 300 may include any of the features of athletic shoe 100, as described herein. In some embodiments, upper 320 may comprise a mesh-knit panel.

In some embodiments, athletic shoe 300 may include an inflation system 400 similar to inflation system 200 shown in FIGS. 1-11. In various embodiments, inflation system 400 may include any of the features of inflation system 200, as described herein, except that inflation system 400 further includes one or more tubes 410A, 410B disposed on upper 320 to secure the wearer's foot in athletic shoe 300 and reduce heel slipping.

Figure 14:
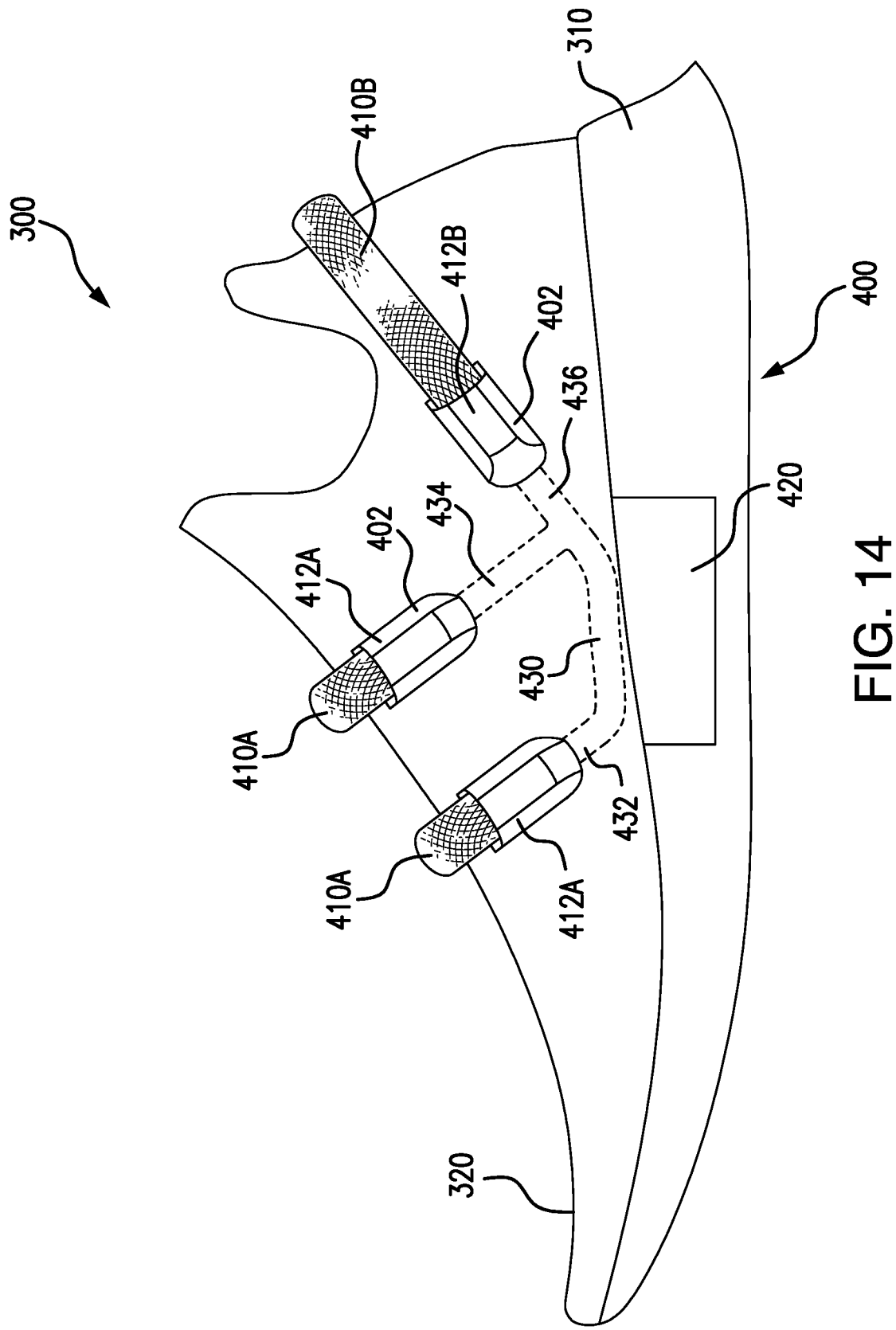
FIG. 14 shows an isolation lateral side view of an article of footwear shows according to embodiments.
Figure 15:
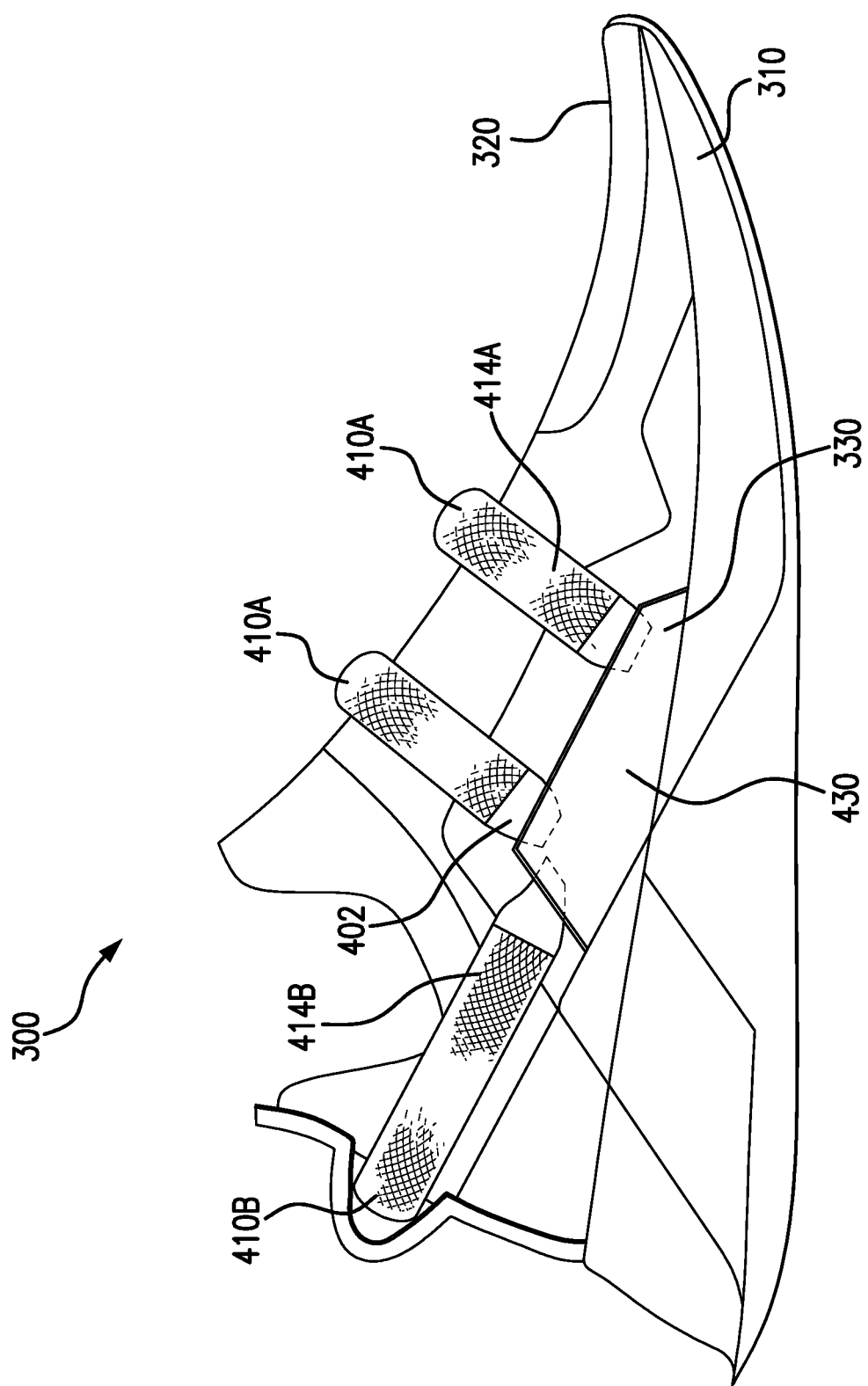
FIG. 15 shows a medial side view of an article of footwear according to embodiments.

In some embodiments, referring to FIGS. 14 and 15, for example, the one or more tubes 410A, 410B may include a set of first tubes 410A extending across a throat region of athletic shoe 300 and including a first end 412A secured to a lateral side of upper 320 and a second end 414A secured to a medial side of upper 320. In some embodiments, the one or more tubes 410A, 410B may include a second tube 410B extending around a heel region of athletic shoe 300 and including a first end 412B secured to a lateral side of upper 320 and a second end 414B secured to a medial side of upper 320. In some embodiments, the one or more tubes 410A, 410B may be comprised of an elastomeric, resilient material and filled with a fluid such that bladder 210 may expand with the delivery of a fluid and rescind with the release of fluid to adjust fit and support provided by athletic shoe 300. In some embodiments, the one or more tubes 410A, 410B may be comprised of a silicon-based material (e.g., latex rubber). In some embodiments, the one or more tubes 410A, 410B may be comprised of a thermoplastic elastomer, a thermoplastic polyurethane, polyethylene, polypropylene, neoprene, polyvinylchloride, nitrile rubber, ethylene vinyl acetate, or a combination thereof.

Figure 17B:
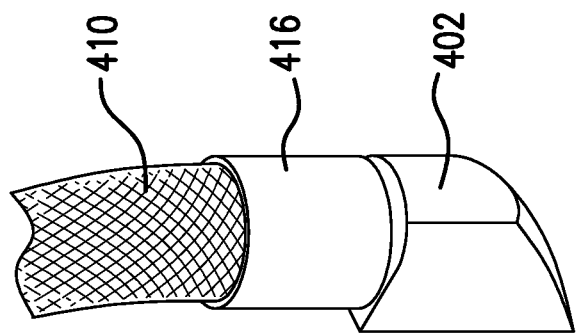
FIG. 17B shows a schematic view of an inflatable tube coupled to a connector according to embodiments.
Figure 17A:
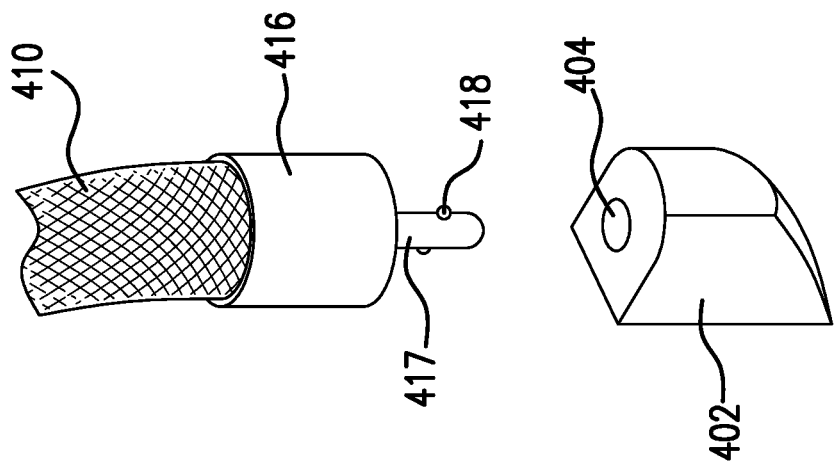
FIG. 17A shows a schematic view of an inflatable tube disconnected from a connector according to embodiments.

In some embodiments, inflation system 400 may include a set of connectors 402 coupled to lateral and medial sides of upper 320 for securing tubes 410A, 410B to upper 320. In some embodiments, as shown in FIGS. 17A, 17B, for example, each connector 402 defines an aperture 404 for receiving an end of a respective tube 410A, 410B. In some embodiments, each of first and second ends 412A-B, and 414A-B of tubes 410A, 410B include a fitting 416 configured to be removably coupled to connector 402. In some embodiments, as shown in FIG. 17B, for example, each fitting 416 may include a flue 417 that is configured to be received in aperture 404 of connector 402. In some embodiments, each flue 417 includes a locking member 418 disposed on a side of flue 417 and configured to interface with connector 402 to secure respective tube 410A, 410A to the connector 410.

In some embodiments, as shown in FIGS. 14-16, for example, inflation system 400 may include a pump module 420 and a duct 430 fluidly connecting pump module 420 to the one or more tubes 410A, 410B. In various embodiments pump module 420 may include any of the features of pump module 220, as described herein, including a housing disposed in sole 310, a pump, a pressure sensor, a foot-detection sensor, a communication interface, a power source, a display, and a control circuitry. In some embodiments, pump module 420 may monitor and adjust air pressure of the one or more tubes 410A, 410B according to operations performed by pump module 220, as described herein. In some embodiments, pump module 420 may pair with a remote device, such as remote device 10 employing the autopump application, as described herein, to regulate the air pressure of tubes 410A, 410B.

In some embodiments, duct 430 may include a set of duct branches 432, 434, 436 extending from pump module 420 to connectors 402 to fluidly connect pump module 420 to the one or more tubes 410A, 410B. In some embodiments, duct 430 may be disposed on the lateral side of upper 320, the medial side of upper 320, or both sides of upper 320 and extend into sole 310 to connect to housing of pump module 420. In some embodiments, each of branches 432, 434, 436 may each be coupled to a respective connector 402 to establish fluid communication with a respective tube 410A, 410B. In some embodiments, connectors 402 define a cavity for receiving duct 436 and opening into aperture 404 to establish fluid communication between a respective tube 410A, 410B and duct 430.

In some embodiments, as shown in FIGS. 14 and 15, for example, athletic shoe 300 may include a cover panel 330 disposed on the lateral side of upper 320, the medial side of upper 320, or both sides of upper 320 to cover duct 430. In some embodiments, connectors 402 project through cover panel 330. In some embodiments, cover panels 330 may be comprised of a thermoplastic polyurethane material. In some embodiments, cover panels 330 may be translucent to show contour of duct 430 disposed below cover panel 330. In some embodiments, cover panels 330 may be directly coupled to sole 310 and free floating from upper 320.

Figure 18:
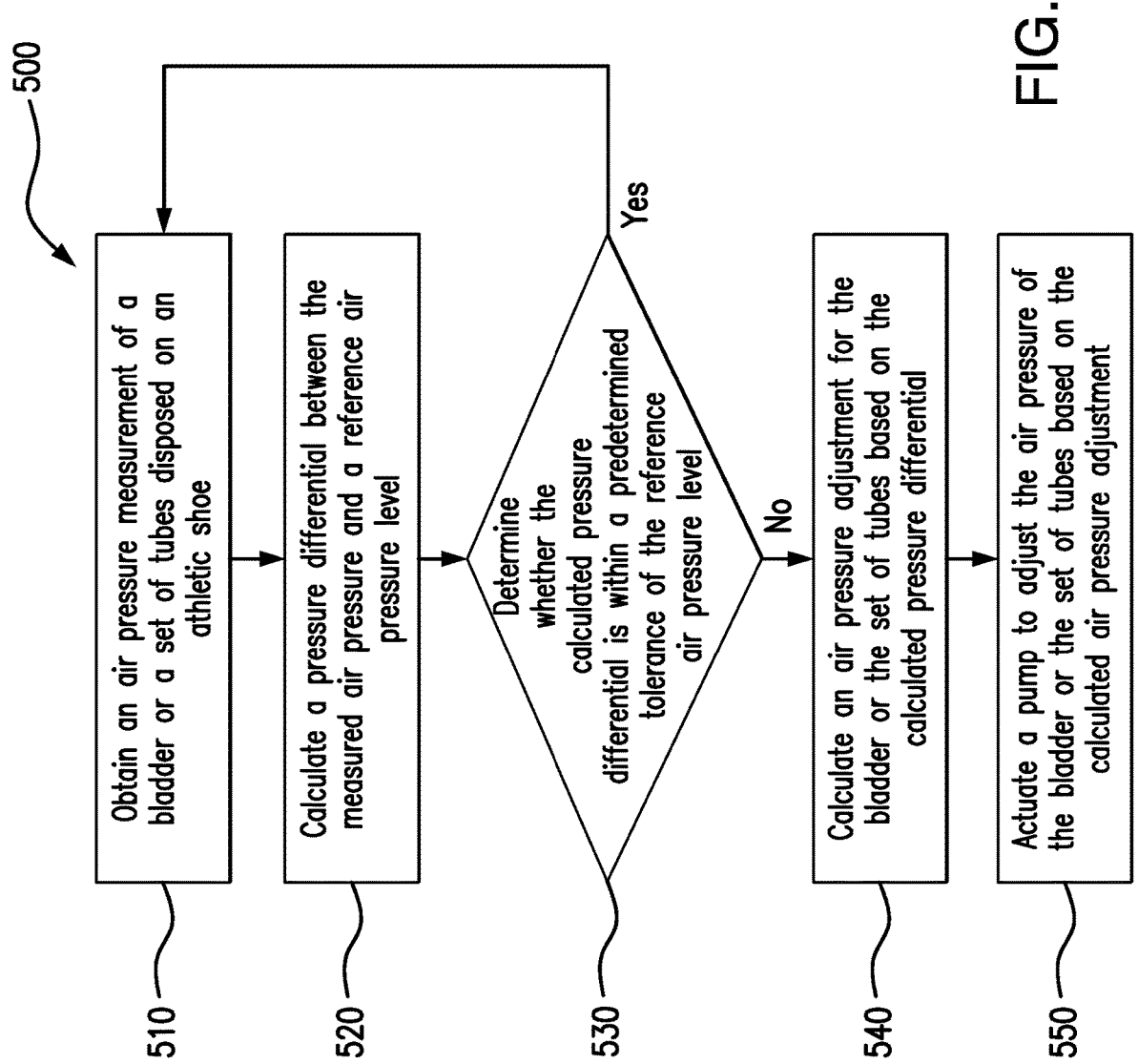
FIG. 18 shows a flow chart of a method for adjusting air pressure of an inflatable bladder or tubes disposed on article of footwear according to embodiments.

FIG. 18 shows a flow chart of an exemplary method 500 executed by a processor, such as a processor in control circuitry 290 or in remote device 10, for monitoring and adjusting the air pressure of bladder 210 or tubes 410A, 410B.

In various embodiments, method 500 may include a step 510 of obtaining an air pressure measurement of bladder 210 or tubes 410A, 410B. In some embodiments, step 510 may include using pressure sensor 240 to monitor the air pressure of bladder 210 or tubes 410A, 410B and transmit a pressure measurement signal representing the measured air pressure of bladder 210 or tubes 410A, 410B.

In various embodiments, method 500 may include a step 520 of calculating a pressure differential between the measured air pressure of bladder 210 or tubes 410A, 410B and a reference air pressure level. In some embodiments, the reference air pressure level is predetermined by programming instructions stored in the memory of control circuitry 290 or the autopump application employed in a remote device. In some embodiments, the reference air pressure level is inputted by the wearer, such as for example, through the autopump application executed on a remote device. In some embodiments, the reference air pressure level is determined based on a type of activity inputted by the wearer through the autopump application executed on a remote device. In some embodiments, the type of activity may be selected from a group comprising running, walking, jumping, and participating in an athletic event, such as basketball, soccer, or track. In some embodiments, the reference air pressure level may be determined by obtaining a plurality of air pressure measurements of bladder 210 associated with a period of time and calculating a desired air pressure level for the inflatable bladder using the plurality of air pressure measurements associated with the period of time, wherein the desired air pressure level is set as the reference air pressure level.

In various embodiments, method 500 may include a step 530 of determining whether the calculated pressure differential is within a predetermined tolerance of the reference air pressure level. In some embodiments, the predetermined tolerance is predetermined by programming instructions stored in the memory of control circuitry 290 or the autopump application employed in a remote device. In some embodiments, the predetermined tolerance may range from about 0 PSI to about 1.5 PSI, including a range from about 0 PSI to about 0.5 PSI for more precise control. In some embodiments, the predetermined tolerance may be modified, such as through autopump application executed on a remote device, so that a wearer may tighten or loosen the precision of air pressure control of bladder 210 or tubes 410A, 410B.

In various embodiments, if the calculated pressure differential does fall within the predetermined tolerance, the processor determines that an air pressure adjustment of bladder 210 or tubes 410A, 410B is not needed at the current moment. Accordingly, as shown in FIG. 18, for example, method 500 may proceed by returning to the start of method 500 to obtain another air pressure measurement of bladder 210 or tubes 410A, 410B. In some embodiments, the processor may wait to restart step 510 for a predetermined time period after determining that a pressure adjustment is not needed at the current moment to reduce energy consumption by pump module 220, 420.

In various embodiments, if the calculated pressure differential does not fall within the predetermined tolerance, method 500 may include a step 540 of calculating an air pressure adjustment for bladder 210 or tubes 410A, 410B based on the calculated pressure differential. In some embodiments, if the calculated pressure differential between measured air pressure and the reference air pressure level results in a negative value, the processor determines that pump 230 needs to inflate bladder 210 or tubes 410A, 410B based on the calculated pressure adjustment. In some embodiments, if the calculated pressure differential between measured air pressure and the reference air pressure level results in a positive value, the processor determines that pump 230 needs to deflate bladder 210 or tubes 410A, 410B based on the calculated pressure adjustment.

In various embodiments, method 500 may include a step 550 of actuating pump 230 to adjust the air pressure of bladder 210 or tubes 410A, 410B based on the calculated air pressure adjustment. In some embodiments, step 550 may include using autopump application executed on remote device 10 to transmit a command signal indicating the calculated pressure adjustment to control circuitry 290, such that control circuitry 290 actuates pump 230 to adjust the air pressure of bladder 210 or tubes 410A, 410B according to the calculated pressure adjustment. In some embodiments, step 550 may include using control circuitry 290 to transmit an actuation signal to pump 230 to adjust the air pressure of bladder 210 or tubes 410A, 410B according to the calculated pressure adjustment.

One or more aspects of the methods of manufacturing a midsole for an article of footwear discussed herein, or any part(s) or function(s) thereof, may be implemented using hardware, software modules, firmware, tangible computer readable media having instructions stored thereon, or a combination thereof and may be implemented in one or more computer systems or other processing systems.

Figure 19:
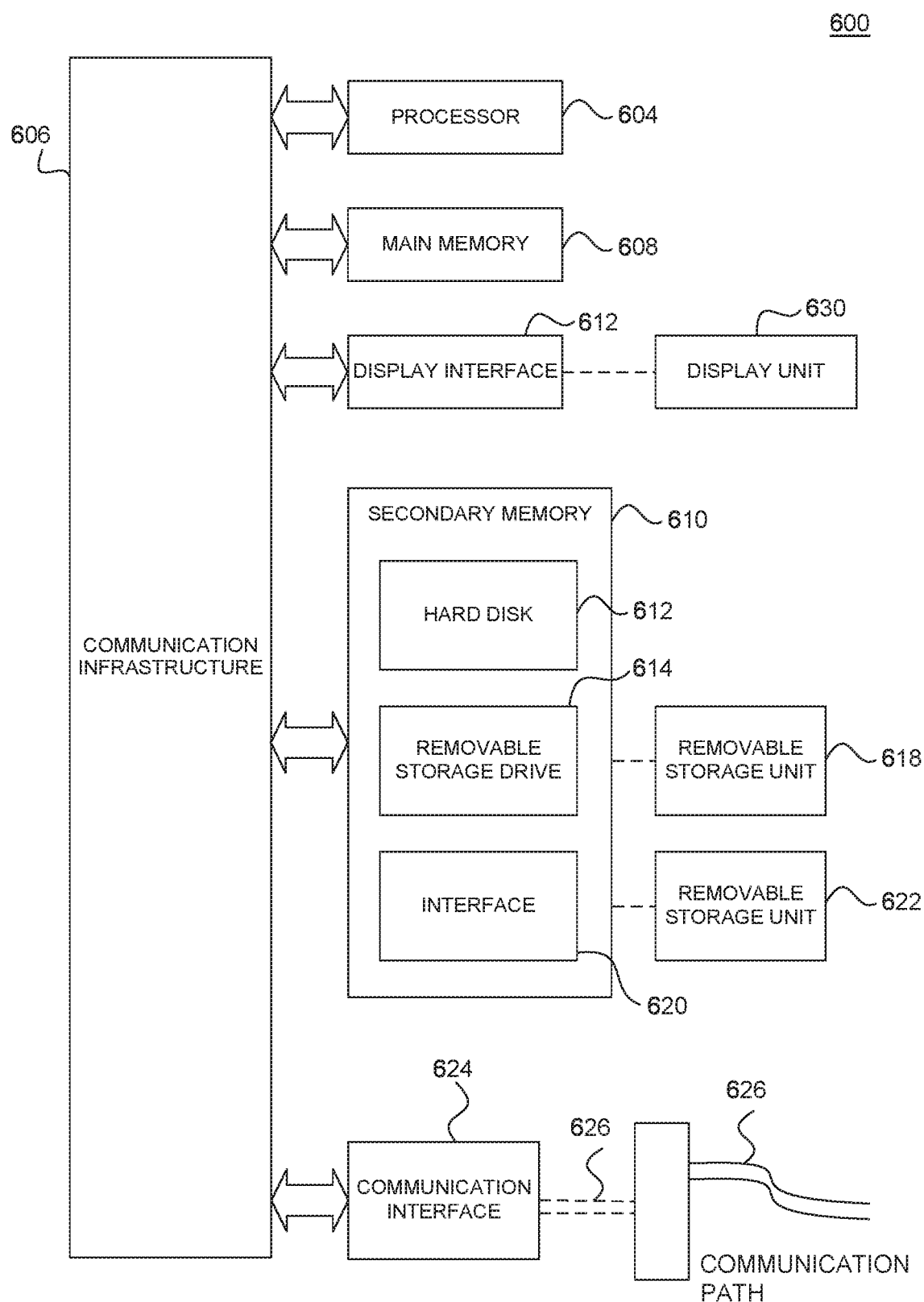
FIG. 19 shows a schematic block diagram of an exemplary computer system in which embodiments may be implemented.

FIG. 19 illustrates an exemplary computer system 600 in which embodiments, or portions thereof, may be implemented as computer-readable code. For example, aspects of the methods discussed herein that may be implemented in one or more computer systems include, but are not limited to, obtaining an air pressure measurement, calculating a pressure differential, determining whether the calculated pressure differential is within a predetermined tolerance of a reference air pressure level, calculating an air pressure adjustment, and actuating a pump, may be implemented in computer system 600 using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the inventions may be implemented in terms of this example computer system 600. After reading this description, it will become apparent to a person skilled in the relevant art how to implement one or more of the inventions using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, RAM, and may also include a secondary memory 610. Secondary memory 610 may include, for example, a hard disk drive 612, or removable storage drive 614. Removable storage drive 614 may include a floppy disk drive, a magnetic tape drive, an optical disk drive, a flash memory, a Universal Serial Bus (USB) drive, or the like. The removable storage drive 614 reads from and/or writes to a removable storage unit 618 in a well-known manner. Removable storage unit 618 may include a floppy disk, magnetic tape, optical disk, etc. which is read by and written to by removable storage drive 614. As will be appreciated by persons skilled in the relevant art, removable storage unit 618 includes a computer usable storage medium having stored therein computer software and/or data.

Computer system 600 (optionally) includes a display interface 602 (which can include input and output devices such as keyboards, mice, etc.) that forwards graphics, text, and other data from communication infrastructure 606 (or from a frame buffer not shown) for display on display unit 630.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an erasable programmable read-only memory (EPROM) or programmable read-only memory (PROM)) and associated socket, and other removable storage units 622 and interfaces 620 which allow software and data to be transferred from the removable storage unit 622 to computer system 600.

Computer system 600 may also include a communication interface 624. Communication interface 624 allows software and data to be transferred between computer system 600 and external devices. Communication interface 624 may include a modem, a network interface (such as an Ethernet card), a communication port, a personal computer memory card international association (PCMCIA) slot and card, or the like. Software and data transferred via communication interface 624 may be in the form of signals, which may be electronic, electromagnetic, optical, or other signals capable of being received by communication interface 624. These signals may be provided to communication interface 624 via a communication path 626. Communication path 626 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. dynamic random access memory (DRAM) etc.).

Computer programs (also called computer control logic) are stored in main memory 608 and/or secondary memory 610. Computer programs may also be received via communication interface 624. Such computer programs, when executed, enable computer system 600 to implement the embodiments as discussed herein. In particular, the computer programs, when executed, enable processor device 604 to implement the processes of the embodiments discussed here. Accordingly, such computer programs represent controllers of the computer system 600. Where the embodiments are implemented using software, the software may be stored in a computer program product and loaded into computer system 600 using removable storage drive 614, interface 620, and hard disk drive 612, or communication interface 624.

Embodiments of the inventions also may be directed to computer program products comprising software stored on any computer useable medium. Such software, when executed in one or more data processing device, causes a data processing device(s) to operate as described herein. Embodiments of the inventions may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, micro-electromechanical systems (MEMS), nanotechnological storage device, etc.).

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An article of footwear comprising:
    a sole;
    an upper coupled to the sole; and
    an inflation system coupled to the article of footwear, the inflation system comprising:
        an inflatable bladder coupled to the upper;
        a pump in fluid communication with the inflatable bladder, the pump configured to adjust the air pressure of the inflatable bladder;
        a control circuitry operatively linked to the pump, the control circuitry configured to transmit a first actuation signal to the pump such that the pump adjusts the air pressure of the inflatable bladder; and
        a display operatively linked to the control circuitry and disposed on the inflatable bladder, the control circuitry programmed to illuminate the display when the pump is actuated by the control circuitry to indicate an air pressure adjustment by the pump.

2. The article of footwear of claim 1, wherein the display comprises a conductive film disposed on the inflatable bladder.

3. The article of footwear of claim 2, wherein the conductive film is disposed along a contour of the inflatable bladder.

4. The article of footwear of claim 2, wherein the conductive film comprises a layer of phosphorous ink.

5. The article of footwear of claim 1, wherein the inflation system comprises a housing disposed in the sole, and the pump and the control circuitry are disposed in the housing.

6. The article of footwear of claim 5, wherein the sole includes a midsole and an outsole disposed below the midsole, and the midsole includes a cavity receiving the housing of the inflation system and the outsole includes a window aligned with the cavity of the midsole to expose a portion of the housing.

* * * * *